(12) United States Patent
Steading

(10) Patent No.: US 9,866,784 B2
(45) Date of Patent: Jan. 9, 2018

(54) METHODS, SYSTEMS, AND PRODUCTS FOR PROGRAMMING GUIDES

(75) Inventor: David Steading, Marietta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 676 days.

(21) Appl. No.: 13/299,388

(22) Filed: Nov. 18, 2011

(65) Prior Publication Data
US 2012/0128326 A1 May 24, 2012

Related U.S. Application Data

(63) Continuation of application No. 11/256,980, filed on Oct. 24, 2005, now Pat. No. 8,082,567, which is a continuation-in-part of application No. 09/748,905, filed on Dec. 27, 2000, now Pat. No. 7,600,245.

(60) Provisional application No. 60/214,529, filed on Jun. 27, 2000.

(51) Int. Cl.
| | |
|---|---|
| H04N 9/80 | (2006.01) |
| H04N 5/445 | (2011.01) |
| H04N 21/431 | (2011.01) |
| H04N 21/472 | (2011.01) |
| H04N 21/482 | (2011.01) |
| H04N 21/858 | (2011.01) |

(52) U.S. Cl.
CPC ....... *H04N 5/44543* (2013.01); *H04N 21/431* (2013.01); *H04N 21/47211* (2013.01); *H04N 21/482* (2013.01); *H04N 21/858* (2013.01)

(58) Field of Classification Search
CPC ............. H04N 5/44543; H04N 21/431; H04N 21/858; H04N 21/482; H04N 21/4314

USPC ........................................................ 386/243
See application file for complete search history.

(56) References Cited

U.S. PATENT DOCUMENTS

| | | | |
|---|---|---|---|
| 4,930,158 | A | 5/1990 | Vogel |
| 4,930,160 | A | 5/1990 | Vogel |
| 5,191,645 | A | 3/1993 | Carlucci et al. |
| 5,195,135 | A | 3/1993 | Palmer |
| 5,398,070 | A | 3/1995 | Lee |
| 5,465,384 | A | 11/1995 | Bejan et al. |
| 5,481,296 | A | 1/1996 | Cragun et al. |

(Continued)

FOREIGN PATENT DOCUMENTS

| | | |
|---|---|---|
| EP | 0 508 939 | 10/1992 |
| EP | 0 952 734 | 10/1999 |

(Continued)

OTHER PUBLICATIONS

Press Release; Excite, Inc.; Excite Couch Potatoes Into Real-Time Online Judges With National Television Event; Mar. 29, 1998 (2 pages).

(Continued)

*Primary Examiner* — Thai Tran
*Assistant Examiner* — Jose Mesa
(74) *Attorney, Agent, or Firm* — Scott P. Zimmerman, PLLC

(57) ABSTRACT

Methods, systems, and products generate a programming guide. An association is stored between programming events and a package of programming. The programming guide is generated as a programming grid of cells that displays a wrapper surrounding all cells in the programming grid of cells that are associated with the programming events in the package of programming.

19 Claims, 27 Drawing Sheets

(56) References Cited

U.S. PATENT DOCUMENTS

| | | | |
|---|---|---|---|
| 5,485,518 A | 1/1996 | Hunter et al. | |
| 5,530,469 A | 6/1996 | Garfinkle | |
| 5,534,911 A | 7/1996 | Levitan | |
| 5,534,913 A | 7/1996 | Majeti et al. | |
| 5,559,949 A | 9/1996 | Reimer et al. | |
| 5,570,415 A | 10/1996 | Stretton et al. | |
| 5,619,247 A | 4/1997 | Russo | |
| 5,619,251 A | 4/1997 | Kuroiwa et al. | |
| 5,668,591 A | 9/1997 | Shintani | |
| 5,671,267 A | 9/1997 | August et al. | |
| 5,694,162 A | 12/1997 | Freeny, Jr. | |
| 5,699,107 A | 12/1997 | Lawler et al. | |
| 5,710,815 A | 1/1998 | Ming et al. | |
| 5,737,552 A | 4/1998 | Lavallee et al. | |
| 5,774,170 A | 6/1998 | Hite et al. | |
| 5,778,135 A | 7/1998 | Ottesen et al. | |
| 5,793,438 A | 8/1998 | Bedard | |
| 5,801,747 A | 9/1998 | Bedard | |
| 5,812,123 A | 9/1998 | Rowe et al. | |
| 5,818,935 A | 10/1998 | Maa | |
| 5,828,402 A | 10/1998 | Collings | |
| 5,850,218 A | 12/1998 | LaJoie et al. | |
| 5,900,915 A | 5/1999 | Morrison | |
| 5,917,481 A | 6/1999 | Rzeszewski | |
| 5,973,682 A | 10/1999 | Saib et al. | |
| 5,973,683 A | 10/1999 | Cragun et al. | |
| 5,982,363 A | 11/1999 | Naiff | |
| 5,982,445 A | 11/1999 | Eyer et al. | |
| 6,008,802 A | 12/1999 | Iki et al. | |
| 6,009,433 A | 12/1999 | Kurano et al. | |
| 6,016,141 A | 1/2000 | Knudson et al. | |
| 6,020,882 A | 2/2000 | Kinghorn et al. | |
| 6,023,267 A | 2/2000 | Chapuis et al. | |
| 6,025,869 A | 2/2000 | Stas | |
| 6,046,760 A | 4/2000 | Jun | |
| 6,057,872 A | 5/2000 | Candelore | |
| 6,088,007 A | 7/2000 | Shioya | |
| 6,104,423 A | 8/2000 | Elam | |
| 6,122,660 A | 9/2000 | Baransky et al. | |
| 6,240,555 B1 | 5/2001 | Shoff et al. | |
| 6,249,320 B1 | 6/2001 | Schneidewend et al. | |
| 6,263,376 B1 | 7/2001 | Hatch et al. | |
| 6,263,505 B1 | 7/2001 | Walker et al. | |
| 6,312,336 B1 | 11/2001 | Handelman et al. | |
| 6,314,572 B1 | 11/2001 | LaRocca et al. | |
| 6,326,982 B1 | 12/2001 | Wu et al. | |
| 6,332,175 B1 * | 12/2001 | Birrell et al. | 711/112 |
| 6,415,326 B1 | 7/2002 | Gupta et al. | |
| 6,463,207 B1 | 10/2002 | Abecassis | |
| 6,483,548 B1 | 11/2002 | Allport | |
| 6,499,138 B1 | 12/2002 | Swix et al. | |
| 6,505,348 B1 | 1/2003 | Knowles et al. | |
| 6,519,770 B2 | 2/2003 | Ford | |
| 6,571,392 B1 | 5/2003 | Zigmond et al. | |
| 6,577,350 B1 | 6/2003 | Proehl et al. | |
| 6,597,405 B1 | 7/2003 | Iggulden | |
| 6,601,103 B1 | 7/2003 | Goldschmidt Iki et al. | |
| 6,604,240 B2 | 8/2003 | Ellis et al. | |
| 6,614,987 B1 | 9/2003 | Ismail et al. | |
| 6,665,870 B1 | 12/2003 | Finseth et al. | |
| 6,668,377 B1 | 12/2003 | Dunn | |
| 6,675,384 B1 | 1/2004 | Block et al. | |
| 6,732,367 B1 | 5/2004 | Ellis et al. | |
| 6,757,906 B1 * | 6/2004 | Look et al. | 725/45 |
| 6,782,550 B1 | 8/2004 | Cao | |
| 6,792,618 B1 | 9/2004 | Bendinelli et al. | |
| 6,853,728 B1 | 2/2005 | Kahn et al. | |
| 6,947,966 B1 | 9/2005 | Oko et al. | |
| 6,978,471 B1 | 12/2005 | Klopfenstein | |
| 7,140,033 B1 | 11/2006 | Durden et al. | |
| 7,200,852 B1 | 4/2007 | Block | |
| 7,500,202 B2 * | 3/2009 | Gerba et al. | 715/856 |
| 9,038,109 B2 | 5/2015 | Steading | |
| 2001/0001159 A1 | 5/2001 | Ford | |
| 2001/0027564 A1 | 10/2001 | Cowan et al. | |
| 2002/0046407 A1 | 4/2002 | Franco | |
| 2002/0056088 A1 | 5/2002 | Silva et al. | |
| 2002/0056129 A1 | 5/2002 | Blackketter et al. | |
| 2002/0073424 A1 | 6/2002 | Ward et al. | |
| 2002/0092017 A1 | 7/2002 | Klosterman et al. | |
| 2002/0184638 A1 | 12/2002 | Agnihotri et al. | |
| 2003/0131356 A1 | 7/2003 | Proehl et al. | |
| 2004/0040034 A1 | 2/2004 | Sullivan et al. | |
| 2005/0047752 A1 | 3/2005 | Wood et al. | |
| 2005/0204387 A1 | 9/2005 | Knudson | |
| 2005/0216936 A1 | 9/2005 | Knudson et al. | |
| 2006/0031883 A1 | 2/2006 | Ellis et al. | |
| 2006/0095937 A1 | 5/2006 | Knudson et al. | |
| 2008/0056088 A2 | 3/2008 | Shuy | |
| 2010/0100909 A1 | 4/2010 | Arsenault et al. | |
| 2011/0185386 A1 | 7/2011 | Schein et al. | |

FOREIGN PATENT DOCUMENTS

| | | |
|---|---|---|
| WO | WO 97/13368 | 4/1997 |
| WO | WO 98/16062 | 4/1998 |
| WO | WO 98/47286 | 10/1998 |
| WO | WO 99/04561 | 1/1999 |
| WO | WO 00/14954 | 3/2000 |
| WO | WO 00/20976 | 4/2000 |

OTHER PUBLICATIONS

"nfl.com: 1997 regular season to get August start", {online} {retrieved on Oct. 26, 2006} http://web.archive.org/web/19970419062432/www.nfl.com/news/nflnews/0326sked.html (10 pages).

Barkai, David. "An Introduction to Peer-to-Peer Computing". Intel Developer Update Magazine. Intel Corporation. Oct. 2000 (7 pages).

Cahners In-Stat Group Report information, Multimedia Home Networking, IEEE 1394 and the Competition, Dec. 2001.

Kate, Ten W. "Trigg & Link A New Dimension in Television Program Making," Proceedings of the European Conference on Multimedia Applications, Services and Techniques, May 1997, (May 1997), pp. 51-65.

\* cited by examiner

FIG. 1
Related Art

| SEP 7 | 9:00 | 9:30 | 10:00 |
|---|---|---|---|
| CNN | Larry King Live | | |
| SHOW | City Slickers | | |
| HBO | Bingo | Home Alone | |
| DISC | All In a Days Work | | All in a Days Work |
| Ed | Math ... Who Needs It? | | Rasslin'ilh |
| ESPN | Major League Baseball | | |
| FAM | Batman | | Star Trek |
| E | In the Best Interest of | | News |
| DISNEY | Casablanca | | Gaslight |
| PEV | Juke | | |

FIG. 2C
Related Art

| Time | 9:00pm | 9:30pm | 10:00pm | 10:30pm | 11:00pm | 11:30pm | 12:00am | 12:30am | 1:00am |
|------|--------|--------|---------|---------|---------|---------|---------|---------|--------|
| 38 NBC | VICTORY | | | | NEWS | TONIGHT SHOW | | | TAXI |
| 39 USA | NANNY | 90210 | MASH | SINGLE GUY | COLUMBO | | TERROR HIGHWAY | | |
| 40 PPV1 | AMERICAN PIE | | | | WWF WRESTLING | | TOUGHMAN | | |
| 41 PPV2 | <<Star Wars Trilogy (Star Wars, Empire Strikes Back and Return of the Jedi $6.95>> | | | | | | | | |

FIG. 4

|  | 8:00 | 9:00 | 10:00 | 11:00 | 12:00 |
|---|---|---|---|---|---|
| PPV 700 | The Sixth Sense | | | The Sixth Sense | |
| PPV 701 | *Star Wars Trilogy* Star Wars | | | Empire Strikes Back | |
| PPV 702 | Titanic | Titanic | | | |
| PPV 703 | Titanic | | Titanic | | |
| PPV 704 | Titanic | | | Titanic | |
| PPV 705 | Wrestlemania #1 | | | Wrestlemania #2 | |
| PPV 706 | Wrestlemania #3 | | | Wrestlemania #4 | |
| PPV 707 | Playboy Movie #1 | Playboy Movie #2 | | Playboy Movie #3 | |

20 — points to PPV 701 Star Wars Trilogy

| PPV 700 | 8:00 PM | The Sixth Sense |
|---|---|---|
| PPV 700 | 10:00 PM | The Sixth Sense |
| PPV 701 | 8:00 PM | Star Wars Trilogy — Star Wars |
| PPV 701 | 10:00 PM | The Empire Strikes Back |
| PPV 701 | 12:00 AM | Return of the Jedi |
| PPV 702 | 9:00 PM | Titanic |
| PPV 702 | 12:00 AM | Titanic |
| PPV 703 | 10:00 PM | Titanic |
| PPV 704 | 11:00 PM | Titanic |

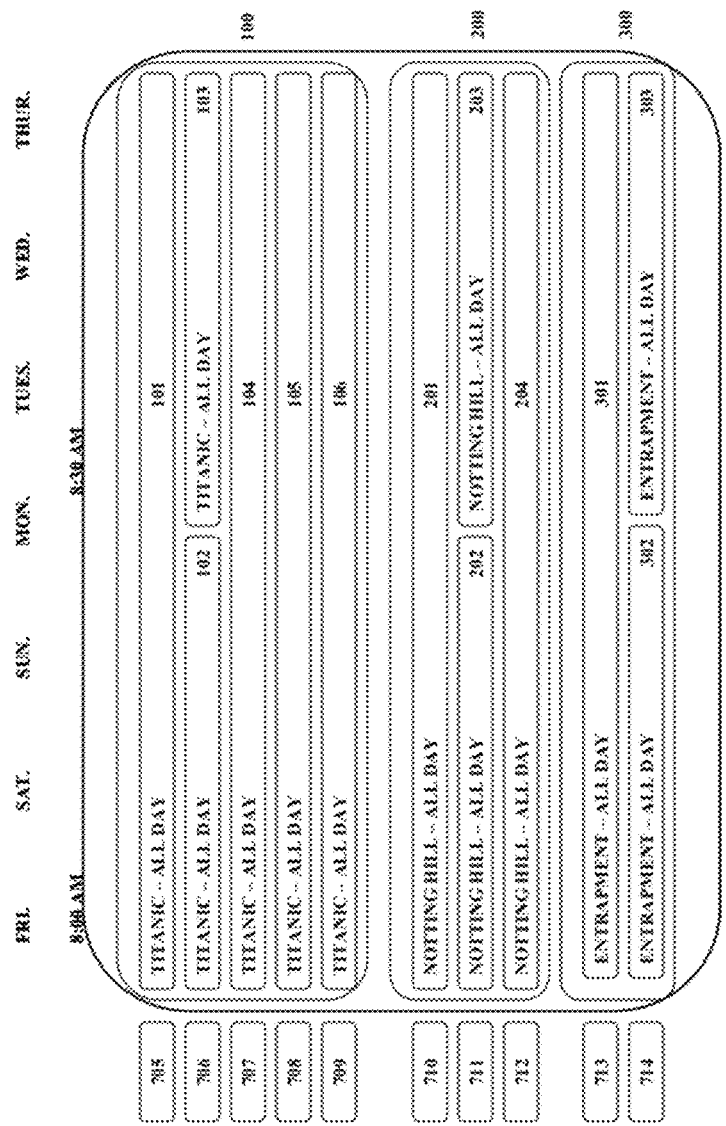

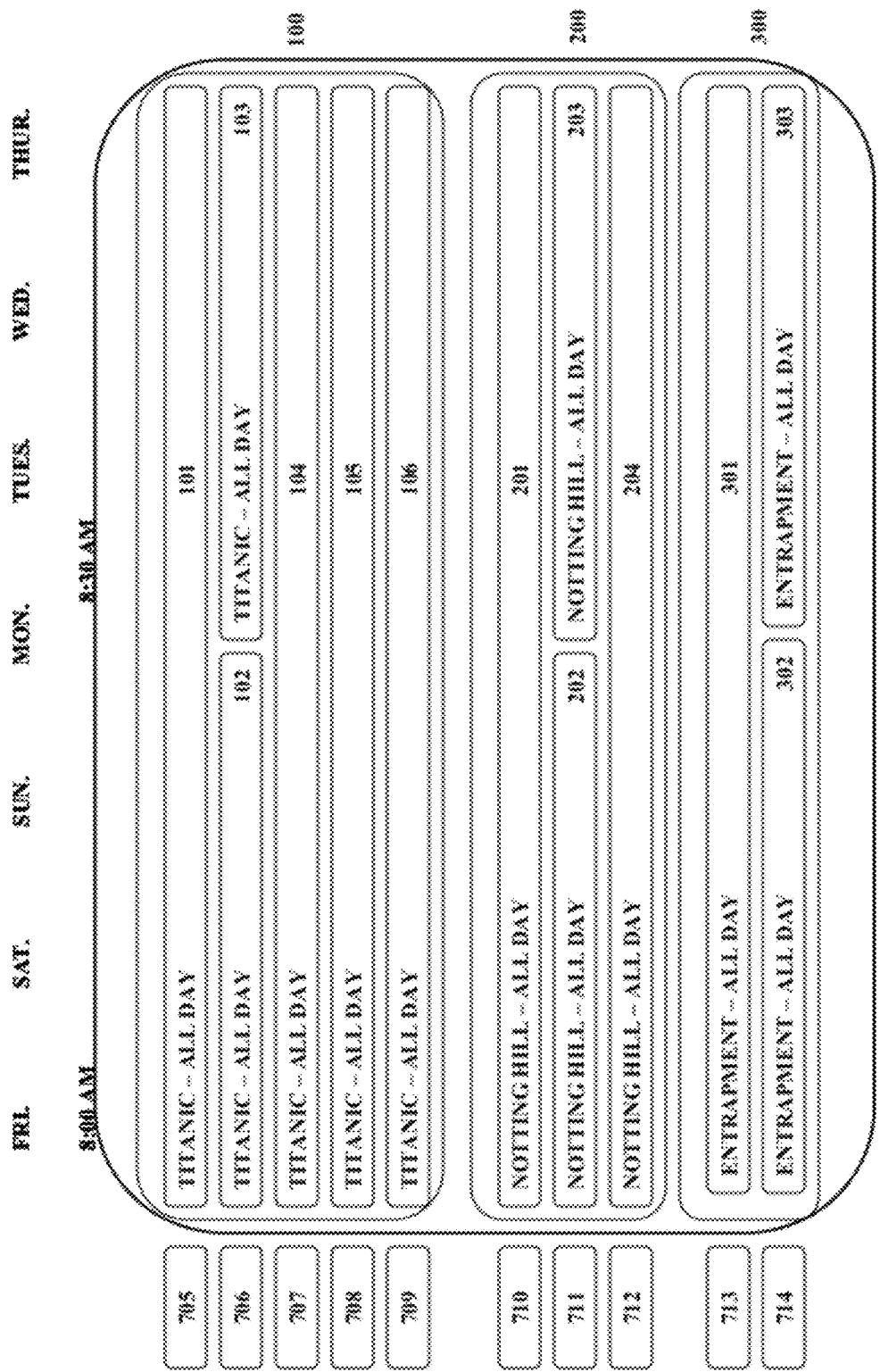

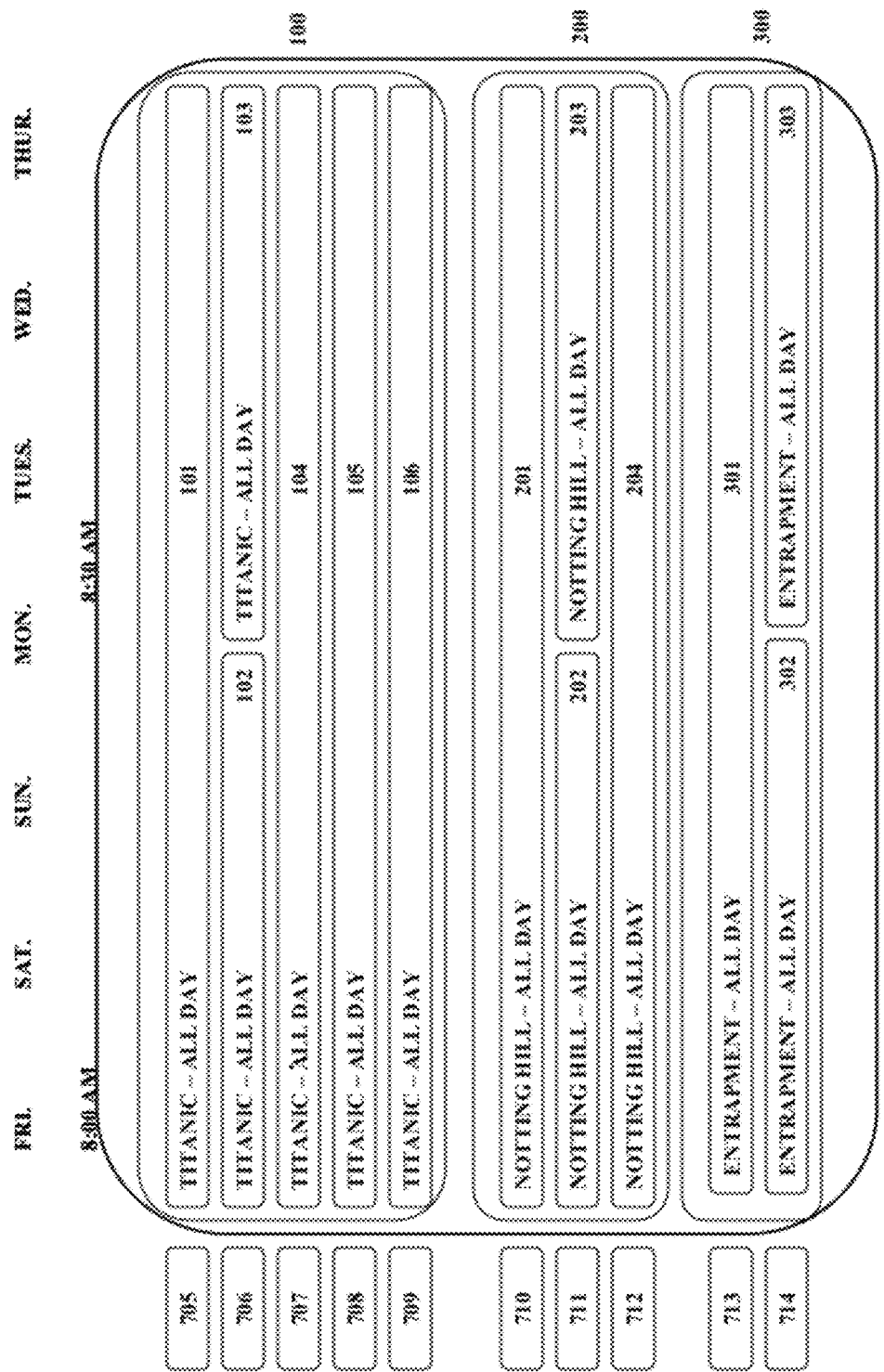

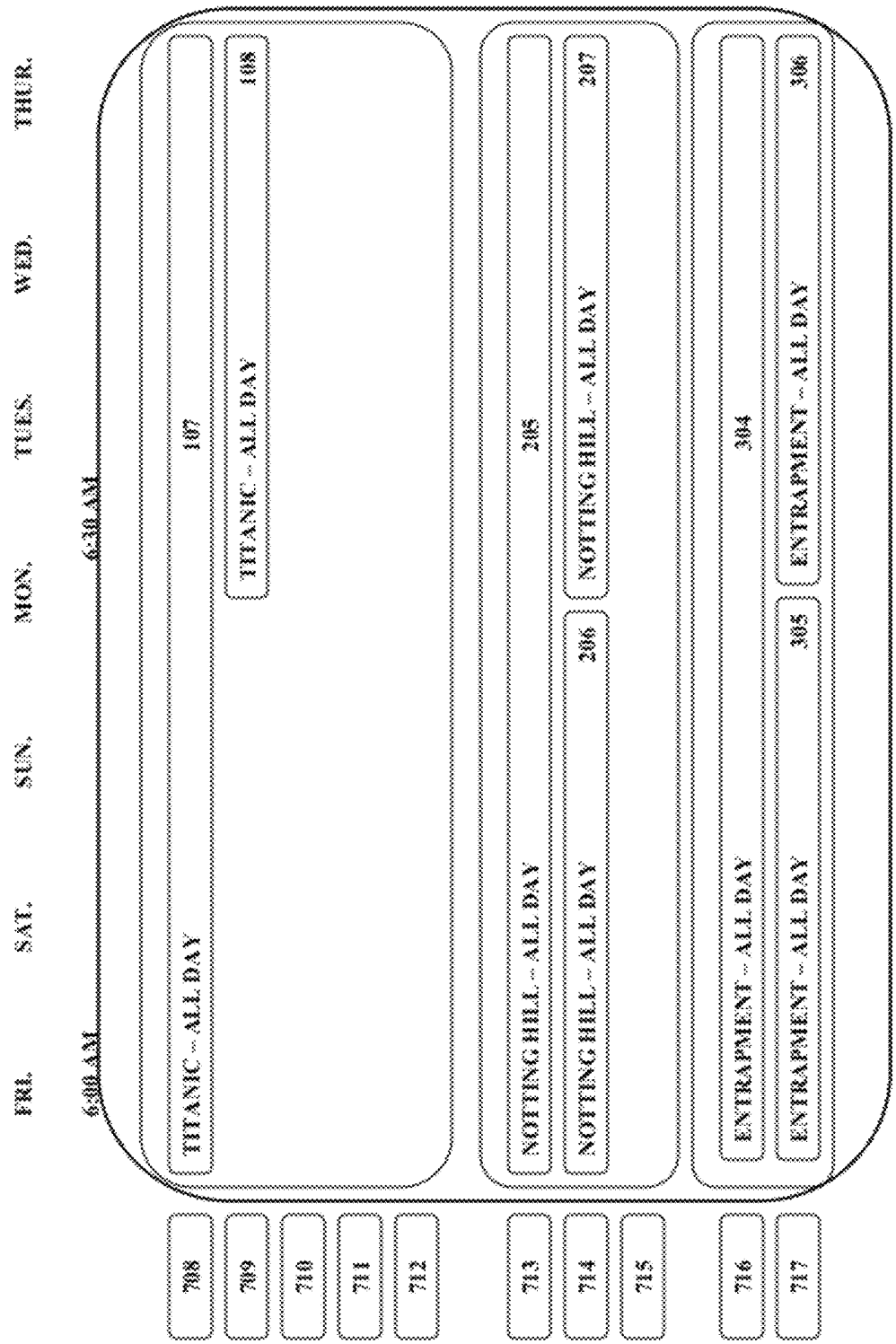

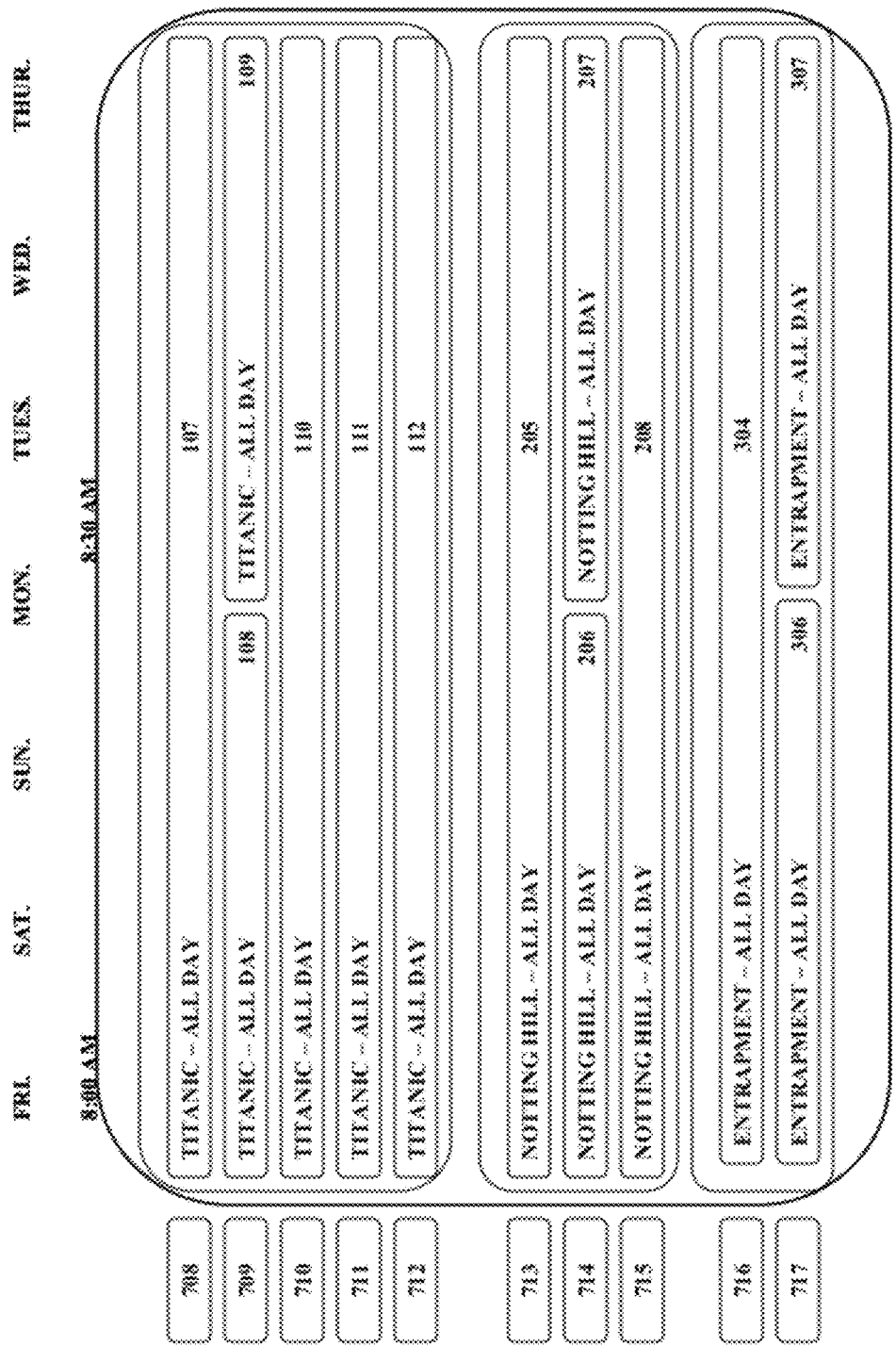

Weekly Ticket Product Mode

Weekly Ticket Product Mode

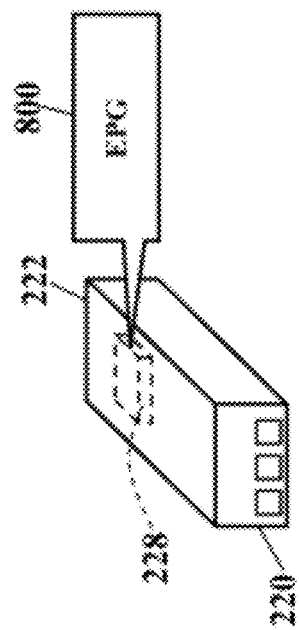
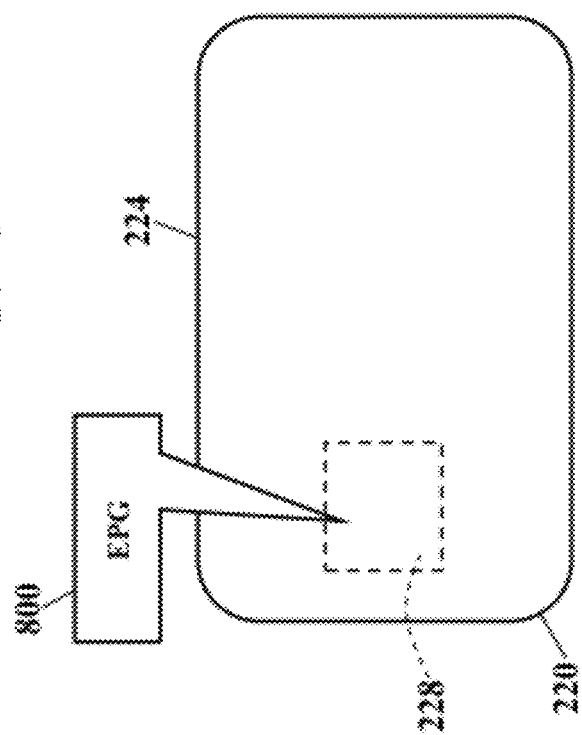

METHODS, SYSTEMS, AND PRODUCTS FOR PROGRAMMING GUIDES

CROSS REFERENCE TO RELATED APPLICATIONS

This application is a continuation of U.S. application Ser. No. 11/256,980 filed Oct. 24, 2005 and now issued as U.S. Pat. No. 8,082,567, which is a continuation-in-part of U.S. patent application Ser. No. 09/748,905 filed Dec. 27, 2000 and now issued as U.S. Pat. No. 7,600,245, which claims the benefit of U.S. Provisional Patent Application 60/214,529 filed Jun. 27, 2000, with all these applications incorporated herein by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

The exemplary embodiments relate to methods, systems, and products for allowing subscribers to view, select and generally customize program delivery.

Consumers today have many programming choices, whether the programming is broadcast over the air, delivered via cable, delivered through a wireless communication system, delivered over the Internet or sent via a satellite communication system. Proliferation of these different delivery mediums has resulted in a much broader array of programming choices available to the consumer, including mainstream broadcast programs, movies, specialty shows, news, sporting events, Pay-Per-View, movies on demand, etc. One of the problems with all of these programming choices is that consumers need methods and systems for efficiently navigating throughout the multiple choices.

Past efforts to address the multiplicity of programming selections have focused on providing subscribers pre-paid and set packages. Cable and satellite delivery systems have long offered channels that can be purchased as part of the subscriber's access. For instance, consumers can purchase access to Cinemax or Moremax movie channels, special sporting events channels, adult channels, etc. These channels provide only a fixed selection of programming material, however. More recently, providers have offered subscribers the ability to buy particular events. For instance, a number of cable companies allow subscribers to call in and order access to particular movies, events or titles. Or, for those systems that have a built-in duplex feature, a subscriber may use her remote control to order a particular movie, sporting event, concert, etc.

To keep up with these ever-proliferating choices, providers have resorted to on-screen or electronic programming guides. A communications system typically receives many data records regarding programming. Each program has a corresponding data record that indicates detail program information like channel, starting and ending times, whether closed-captioning and stereo are available, etc. Prior systems have long formatted these records into a programming grid, such as shown in FIG. 1. The grid is typically formatted once at a central location and broadcast repeatedly to the homes served. Communications systems often include a channel dedicated to displaying the grid. At any particular time, a user can tune that channel and review each programming entry—usually listed in a row as CNN, Showtime, or HBO, etc.—and time—often in the grid column as a particular one-half hour time slot, such as 9:00 p.m. to 9:30 p.m. Grids may scroll vertically so that a viewer can scan a number of different channels within three or four time slots.

Programming guides like these are relatively easy to deploy, because they may be centrally implemented, e.g., at a cable headend. The subscriber's location needs no additional electronics or software because the central location fully controls the display. The television viewer simply tunes the cable converter box, television tuner, digital satellite receiver, or other tuning device to the channel offering the schedule information and views the program listings. But a major disadvantage of such a programming guide is its non-interactive nature. In other words, the subscriber must wait for the scrolling guide to reach a channel of interest, and, thereafter, he cannot get additional information regarding a program of interest, for example, the cast of actors, a plot line, etc. Thus, in a system where there are hundreds of channels, the scrolling program guide can take tens of minutes to cycle through causing the subscriber to miss programming.

Newer, interactive programming distribution systems feature Electronic Program Guides or EPGs, as depicted in FIGS. 2A and 2B, which result in somewhat similar functionality. However, instead of the guide scrolling automatically, an EPG allows a viewer to use a remote control device to scroll as desired, both horizontally across time and vertically through the channel grid. For example, in FIG. 2A the subscriber has selected the movie "Victory," as seen by the shading of the grid cell. A grid cell is the "container" that accommodates the information relating to the event and becomes highlighted when selected. If the subscriber wants to select the television show "Columbo," all he need do is press the right arrow once and the down arrow once and the grid cell for "Columbo" becomes highlighted, as shown in FIG. 2B. EPG systems, like those shown in FIG. 2, utilize the two-way communications capabilities of interactive cable systems. In many EPG systems, the subscriber may activate a remote control to enter an information screen that brings up pertinent data regarding the programming event contained in the grid cell, for example, cast of characters, plot-line, closed captioning data, etc. In some systems, impulse purchasing allows the subscriber to purchase a selected Pay-Per-View show by pressing a command button on the remote control.

Even though current EPG systems can provide a user with information, they cannot simultaneously provide a user with both PPV event and PPV package information. Stated another way, current systems let subscribers know of a single event (e.g., Star Wars Return of the Jedi) or a package (all Star Wars movies) but not both simultaneously. Thus, one cannot, for example, figure out when each movie starts in the Star Wars package. In addition, current EPG systems also fail to display PPV packages such that they can easily be navigated, providing the subscriber with access to both PPV package and event choices.

In today's EPG system, the subscriber must scroll through each event individually, and since many of the same events are playing on multiple channels, scrolling through hundreds of channels is both time consuming and annoying. Furthermore, many new PPV products are being introduced to the market and current EPGs lack the functionality to list these products. This is especially true with regard to multi-event PPV packages, for example, all-day by title, all-day by channel, multi-hour series, season ticket or weekend ticket/weekly ticket/biweekly ticket. With many existing EPGs and PPV systems, purchasable events are often packaged together into a "PPV product," "PPV package" or "package." In addition to the titles for the individual events, there is often an overall package title. For instance, the movies Star Wars, The Empire Strikes Back, and Return of the Jedi might be bundled together into a PPV packaged entitled "Star Wars Trilogy," as shown in FIG. 2C.

Package purchase may be done by the EPG displaying the individual events that make up the package in the usual grid or list format. As usual, the subscriber may highlight an individual event, display information on it, and purchase it. When the subscriber purchases an individual event that is part of a package, the entire package may be purchased and the subscriber may view all of the events within the package. Indeed, U.S. Pat. No. 6,016,141 describes just such a system. This approach only allows event display and navigation in the usual way. In other words, subscribers will not know whether the event is part of a package unless that is indicated in the event's title. For instance, using the "Star Wars Trilogy" example discussed earlier, each movie that makes up the package could have the words "Trilogy Package" added to its title. In this case, the movie Return of the Jedi would be displayed as "Return of the Jedi—Trilogy Package". Unfortunately, this approach creates its own problems. The EPG's grid or list may not be able to accommodate such a long title. Moreover, subscribers may not understand that the title indicates a package rather than an individual event.

A variation of this approach might be to add information to the event's description (synopsis) indicating it is part of a package. For instance, the description for Return of the Jedi could include text stating, "Your purchase also includes The Empire Strikes Back and Star Wars." Again, this extra text may not fit in the space provided for the display of the event's description. Subscribers also will not see the text unless the subscriber highlighted the individual event and displayed its description, something a subscriber may not do if they are already familiar with the content of the movie. Also, because the text does not appear in the grid or list, it will have limited influence on the subscriber's impulse buying decision.

Text can be added to the first screen that appears when the subscriber attempts to purchase the event. This screen is often referred to as the "buy screen." The problem with this approach is that the subscriber is unlikely to initiate the buy sequence and see the "buy screen" unless they have already decided to purchase the event. As a result, the text on the buy screen acts primarily as a confirmation message and has little value in influencing the subscriber's initial impulse purchase decision.

A totally different approach might be to merge the individual events that make up the package into one long event, as shown in FIG. 2C. For instance, instead of having individual events entitled Star Wars, The Empire Strikes Back, and Return of the Jedi, the events could be combined together into one large event cell entitled "The Star Wars Trilogy." The description box or "buy screen" for this jumbo event could list the names of the individual events in the package. However, this approach would have the same disadvantages as described above. Furthermore, the EPG's grid or list would not display the start and stop times for individual events within the package or critical information for some subscribers. Also, the subscriber could not highlight an individual event to display information on it, set a reminder for it or schedule it to record.

The approaches discussed all have individual problems; even worse none provide the subscriber the option of purchasing the entire package or individual events within the package. For instance, a service provider cannot offer the Star Wars Trilogy Package for $6.95 and individual events such as Return of the Jedi for $2.95 unless an extra menu screen was added to the buy process.

Accordingly, exemplary embodiments aim to allow for viewing of PPV products such that the subscriber can scroll through packages, and the individual events within each package. Exemplary embodiments let programming providers offer multi-event PPV products that span multiple channels over non-contiguous time slots. Further, subscribers scroll through the many available channels rapidly without having to scroll on an event by event basis. The system lets the subscriber view packages and enter into the individual events forming each package. This allows subscribers simultaneously to obtain information regarding the PPV package and also information pertaining to each event within the package. Furthermore, it provides the subscriber the ability to purchase a PPV package or a single event within the multi-event package. Additionally, since the user can select either the package or an individual event, the user may use functions such as, for example, autotune or autorecord on either the package or event level.

SUMMARY

Exemplary embodiments provide subscribers the flexibility to view, select and customize presentation of programming in a manner not previously available. For programming providers, exemplary embodiments allow the providers to market a broader array of products to subscribers, whereby programming revenues can be driven through subscribers' customization of programming selection rather than delivery of programming via standard specialty channels or a set of Pay-Per-View events. For subscribers, the exemplary embodiments allow rapid access to information necessary to select programming of interest.

The system according to the exemplary embodiments comprise one or more program source(s) linked to event information. The program sources, could be, for instance, a video server coupled with an event information server. The program source couples, such as, via a broadcast programming communication system, to a number of subscribers to the program. The broadcast programming system may comprise a cable system, a wireless system, a satellite system or a broadcast system. Each subscriber has (1) a display device for displaying programming and (2) a control device, like a set top box coupled to the display device or, like a processor built into the display device as one component thereof, by which the subscriber selects programs of interest to be displayed. Programming providers can combine one or multiple programmed events into multi-event packages. Subscribers can select, view information about particular packages or events therein and purchase desired packages or events therein.

The exemplary embodiments include an EPG that allows subscribers to view programming packages and associated information. The EPG allows a subscriber to view individual events on regular cable channels and also multi-event PPV products as a single package. The subscriber can scroll through the multi-event PPV product wrappers until a product of interest is found. If the subscriber wants additional information about the individual events contained within each product wrapper, the subscriber toggles a viewing mode that allows the subscriber to scroll through individual event wrappers located within each product wrapper. Thus, the EPG allows a subscriber to view and/or purchase an entire product or to view and/or purchase a single event within the product. In addition, the subscriber can, through the EPG, obtain more product information concerning the event or package.

The exemplary embodiments may accomplish these features by packaging associated programming events into products that are contained within a package wrapper. Thus, as the subscriber scrolls from product to product, the package wrapper, which surrounds multiple events, alerts the subscriber that he has selected a particular product. If the product is a package, to view individual events, the subscriber activates the control device, e.g., via a remote control, for example, double-clicking the enter button, which causes the EPG system to enter a second viewing mode. In the second viewing mode, the subscriber can scroll amongst event cells within the same package or between packages. In effect, the EPG product mode, which allows the subscriber to scroll amongst package wrappers, provides faster, but more detailed, navigation through the programming choices. Furthermore, while in the package scrolling mode the subscriber may interactively purchase a multi-event package by using command buttons on the remote control. In addition, if the subscriber only wants to purchase a single event within the package, he need only enter the second viewing mode, select the event cell of interest and purchase it. In this same manner the subscriber may obtain information about the package or the individual event.

The enhanced EPG has the ability to display a PPV package and its individual PPV events on the screen at the same time. The subscriber can highlight the complete package or an individual event and perform operations such as the following:

Display information on an individual event, a package or event that is part of a package;
  Set a reminder for the subscriber to view an event or package;
  Schedule an event or package to be automatically tuned or recorded;
  Buy an event package or an individual event that is part of a package; and
  Tune to the channel showing the event or package.

The exemplary embodiments achieve one, all, or combinations of the following objectives:

to provide systems and methods for programming providers to offer broader selections and combinations of programming events to subscribers;
  to provide systems and methods for subscribers to obtain more information on programming events;
  to provide systems and methods for subscribers to obtain information about series of associated events;
  to enhance programming revenues by providing subscribers more programming options at more flexible costs; and
  to provide improved programming guides, navigation capacities and information for presentation to subscribers of communication systems providing various programming events.

The exemplary embodiments include methods, systems, and products for providing programming. One such method receives information regarding events associated with products. The information is processed as a programming grid in an electronic programming guide. The programming grid simultaneously lists i) a wrapper associated with each product and ii) each product's associated events.

Yet more exemplary embodiments describe a system that processes an electronic programming guide. The system includes a processor communicating with a user interface. The processor receives information regarding events associated with products. The processor processes the information as programming grid in an electronic programming guide. The programming grid simultaneously lists i) a wrapper associated with each product and ii) each product's associated events.

Still more exemplary embodiments describe a computer program product. The computer program product comprises computer-readable instructions or code. These instructions receive information regarding events associated with products. The information is presented as a programming grid in an electronic programming guide. The programming grid simultaneously lists i) a wrapper associated with each product and ii) each product's associated events.

BRIEF DESCRIPTION OF THE DRAWINGS

These and other features, aspects, and advantages of the exemplary embodiments are better understood when the following Detailed Description is read with reference to the accompanying drawings, wherein:

FIG. 1 is a non-interactive program guide modulated onto a cable TV channel.

FIG. 2C is the EPG grid of FIG. 2A, showing a single channel multi-event PPV package.

FIG. 4 is a display of an EPG grid according to exemplary embodiments that allow selection of PPV packages and PPV events and shows the multi-event package of Star Wars Trilogy being selected.

FIG. 5 is a display of a second embodiment of the new and improved EPG grid, which displays PPV products in a list format and shows the multi-event product of Star Wars Trilogy being selected.

FIG. 6 is the EPG grid of FIG. 4 with the multi-event All-day by Title package of Titanic being selected.

FIG. 7 is the EPG grid of FIG. 4 with a different PPV package being selected.

FIG. 8 is the EPG grid of FIG. 4 with a different PPV package being selected.

FIG. 9 is a display of the EPG grid of FIG. 4, shifted in time by one day so that the next day's All-day by Title package is being displayed.

FIG. 10 is the EPG grid of FIG. 7 shifted in forward in time by two-hours.

FIGS. 23-27 are schematics further illustrating various other media devices for providing programming, according to exemplary embodiments.

DETAILED DESCRIPTION

Figure 2A:
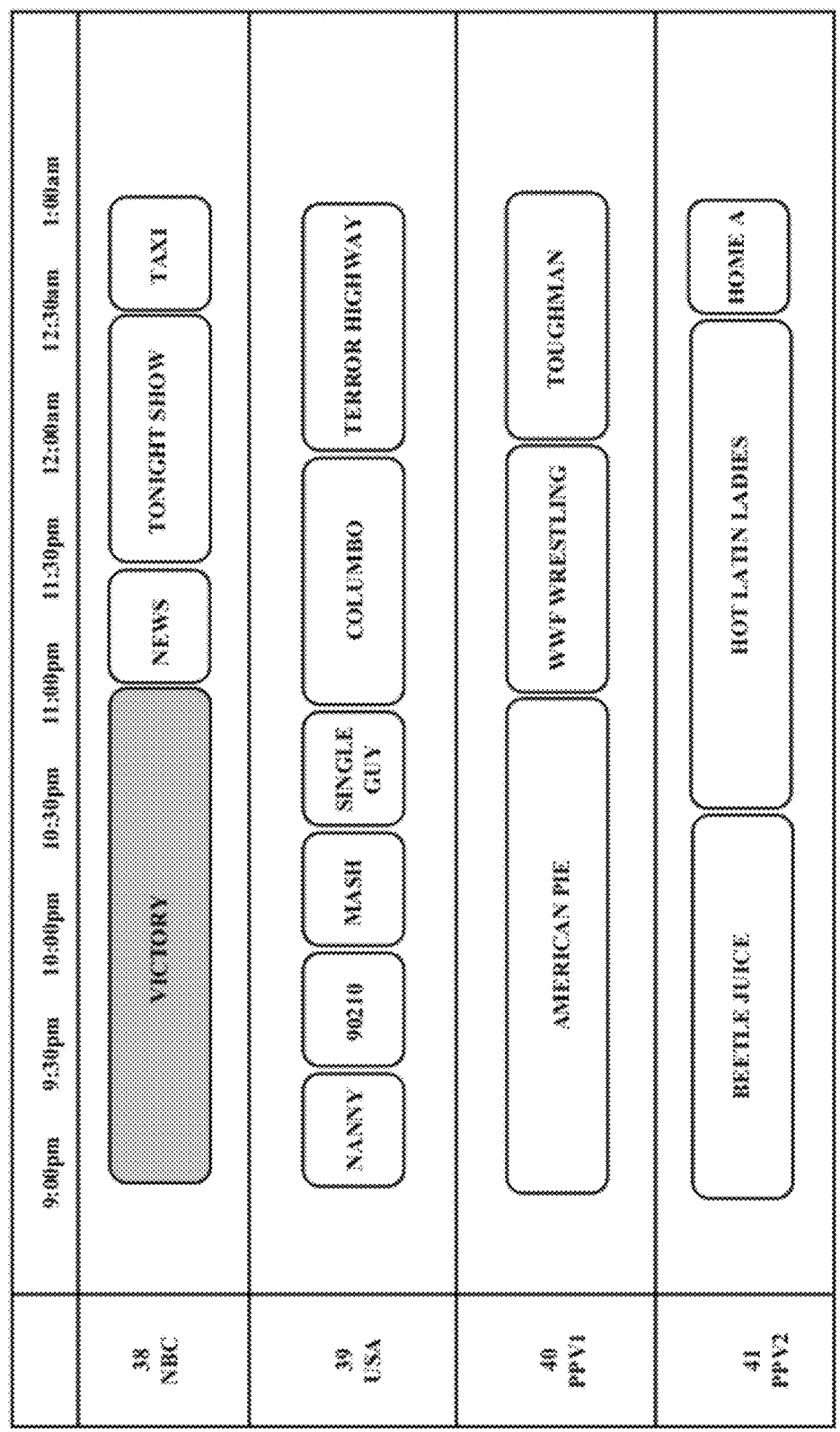
FIG. 2A is an interactive Electronic Program Guide (EPG) grid that is displayed when the guide feature is entered.
Figure 2B:
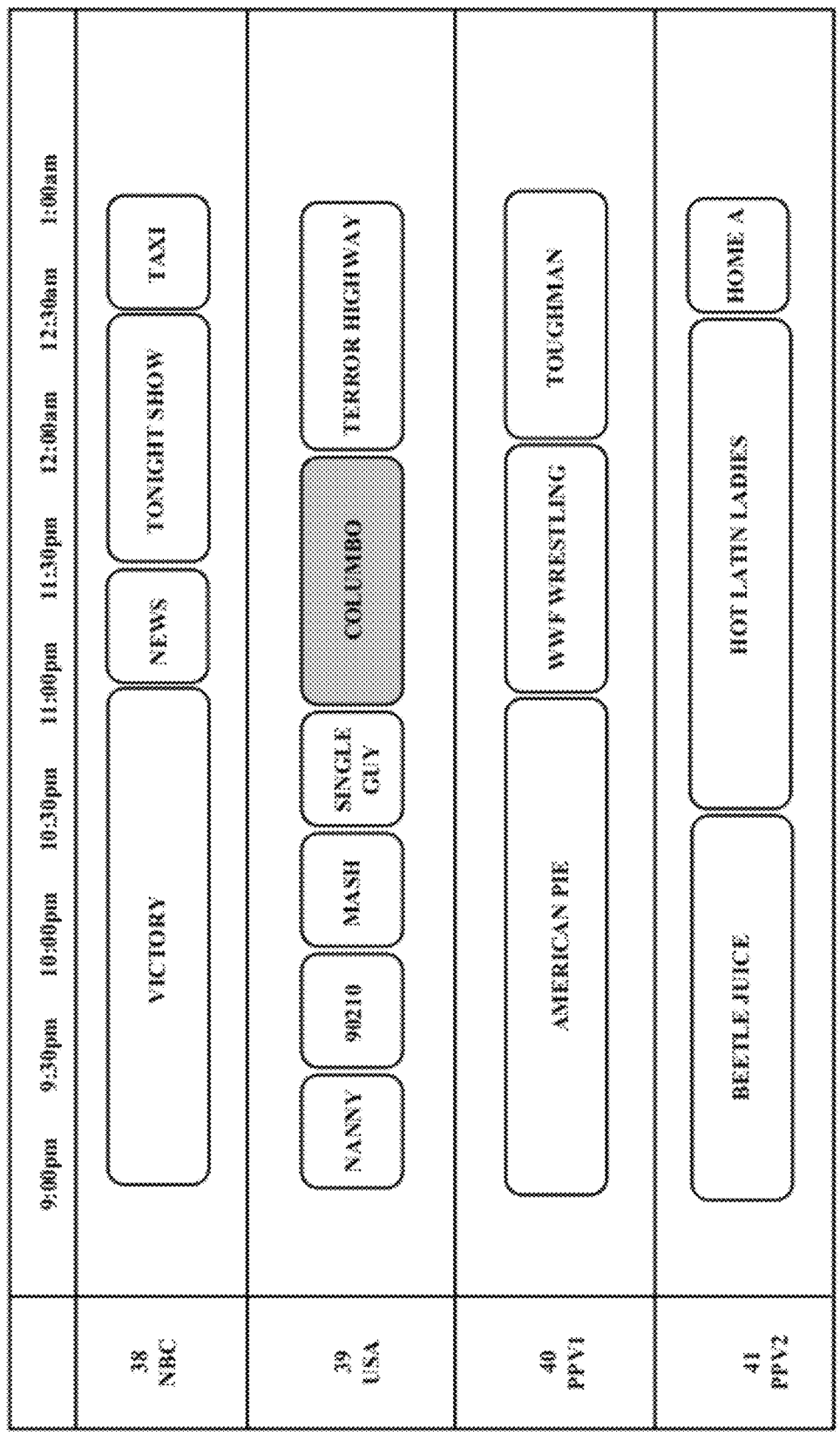
FIG. 2B is the EPG grid of FIG. 2A, with a different program being selected.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

General Terms:

Before describing the drawings and embodiments in more detail, several terms are described below in an effort to clarify the terminology used in this document. Additional and fuller understanding of these terms will be clear to a person skilled in this art, especially upon their reading this entire document:

Channel: A frequency band for transmitting television programming, in which is received by a tuner and displayed on a television set, for example, channel 2.

Electronic Program Guide: An electronic program guide is a grid, table or other presentation of programming information organized by various parameters, such as, channel and time.

Event Cell: An event cell is the "container" that accommodates the information relating to the event and becomes highlighted when selected by the user.

Event: An event is a single entertainment program ranging from cable, to sports, to broadcast television, to movies, to interactive events, such as web casts.

Hyperscroll: Hyperscroll is a viewing mode that allows a user to move from one event to another within a Pay-Per-View Package.

Navigate: Navigating is the ability to control the movement of the cursor from one program listing to another in the electronic program guide.

Package: A package is a preassembled grouping of individual events to be sold as a single package.

Product Wrapper: A product wrapper is the "container" that accommodates the information relating to a group of individual events and becomes highlighted when selected by the user.

Programming Data: Programming data includes information describing the event's appearance on the broadcast medium. Such information may include: channel, start time, end time, content descriptor, title and pricing information Programming System: The programming system comprises the equipment necessary to deliver the programming guide to the user, for example, a cable system, a wireless system, a satellite system or a broadcast system.

Screen: A screen is the data that is displayed or projected for the user to view.

Scroll: To cause text or graphics to move, e.g., vertically or horizontally, across a screen so that a new line of data appears for every line of data that moves off the screen.

Set Top Box: A set-top box is a device that enables a television set to become a user interface to the Internet, cable, satellite or which enables a television set to receive and decode digital television broadcasts. The set top box may be a stand alone component or it may include software and hardware integrated into the television or other components associated therewith.

Subscriber: A subscriber is someone who pays for programming service and uses the EPG information to determine what programming is available on each channel.

Figure 3:
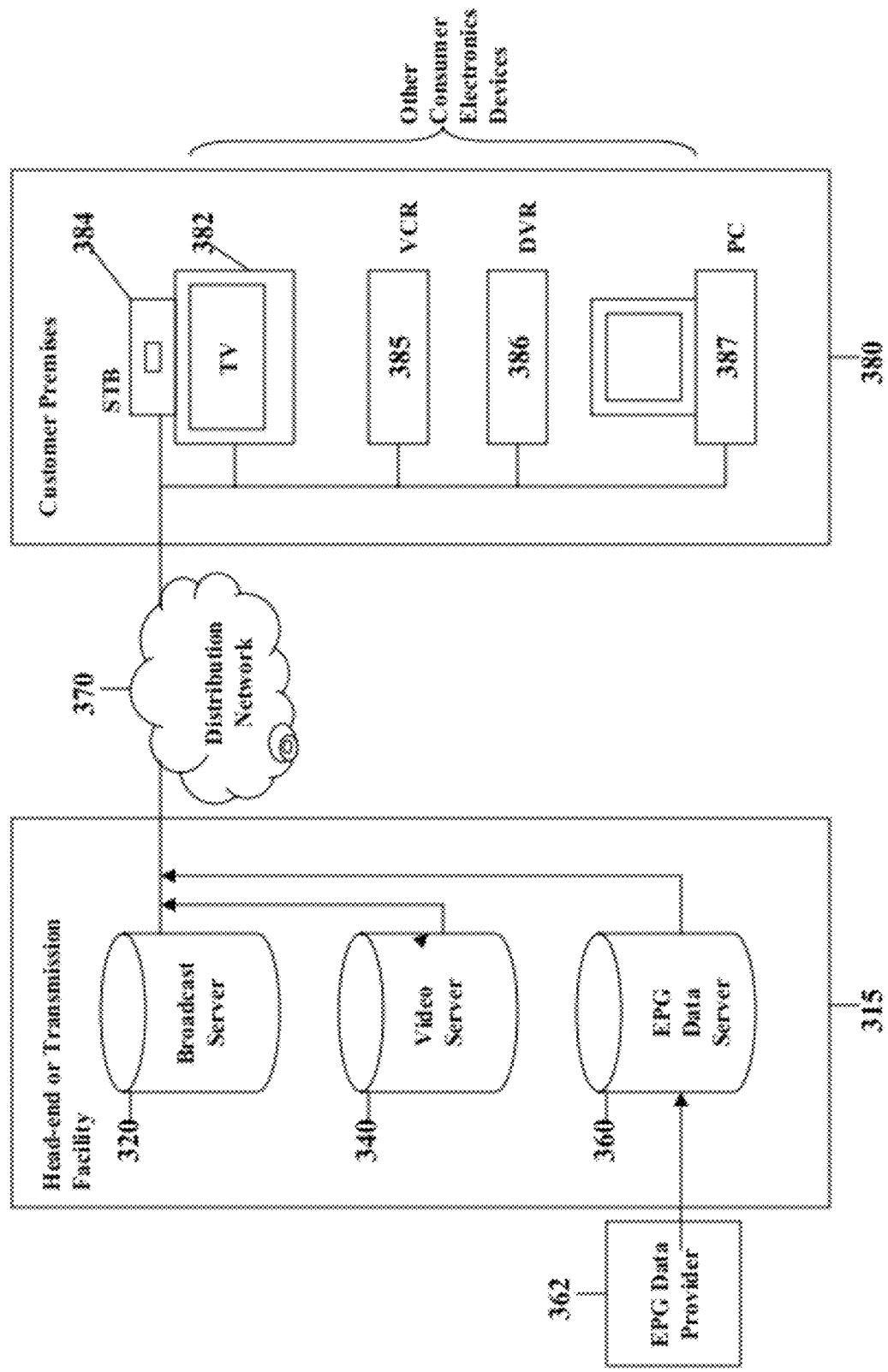
FIG. 3 depicts an EPG distribution system and components for delivering an EPG to the subscriber.
Figure 11:
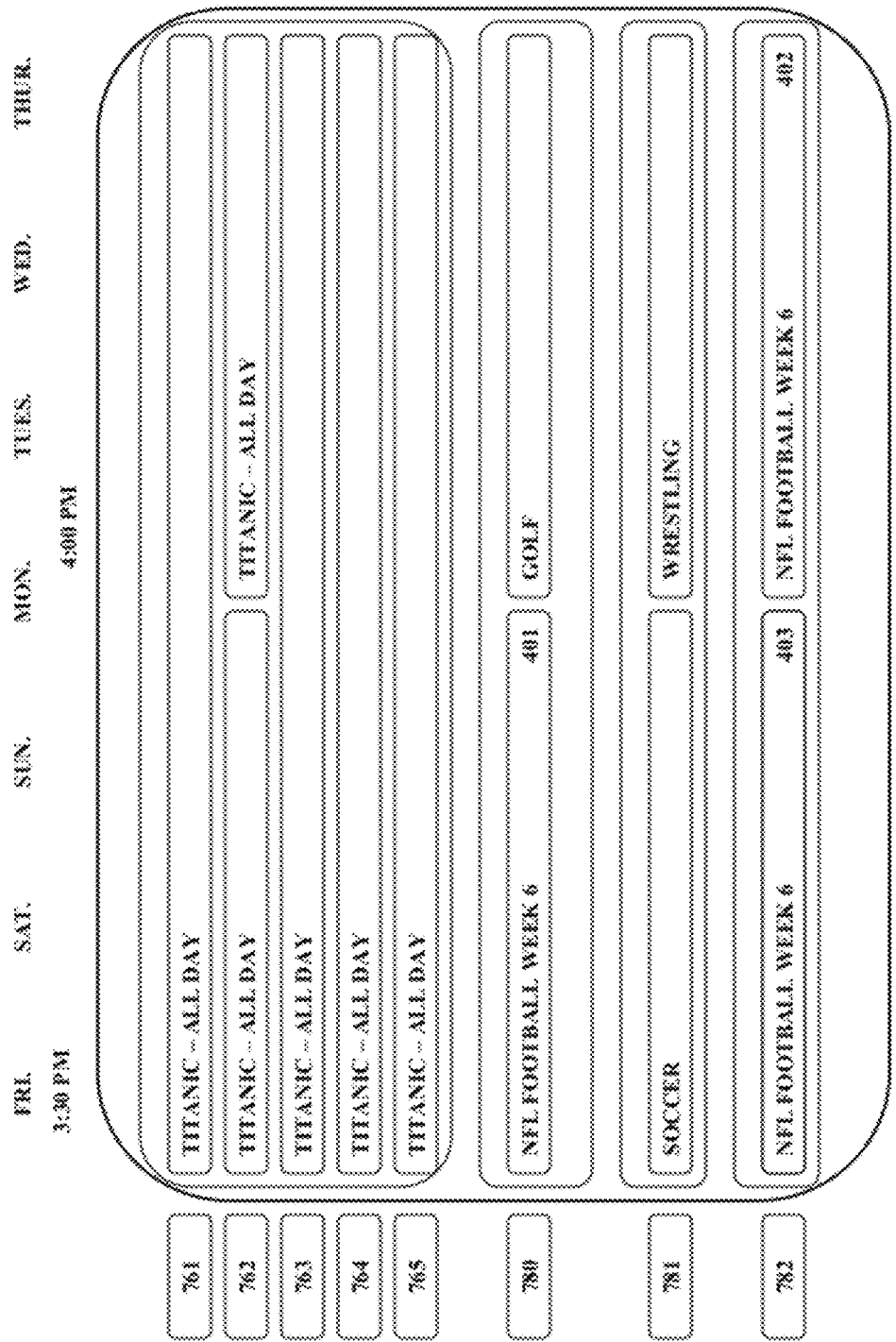
FIG. 11 is the EPG grid displaying a Weekly Ticket package.

Overview:

FIG. 3 shows an overview of a system according to exemplary embodiments. FIG. 3 shows a transmission facility 315, which can be in a cable system, a cable head-end or the like. In a satellite delivery system, the transmission facility 315 may be a centralized facility or regional facility serving all or portions of the satellite distribution network. Likewise, for a regular broadcast communication system, the transmission facility 315 can be a local or national affiliate. In any event, transmission facility 315 has the components necessary to broadcast various programming events, store those events and store data associated with those events. In an embodiment shown in FIG. 3, transmission facility 315 has a broadcast server 320, a video server 340, and an EPG data server 360. As a skilled person will understand, each of these servers, 320, 340 and 360 may be supplied by third parties. For instance, FIG. 3 shows that an EPG data provider 362 provides the data that is stored by the EPG data server 360. Broadcast server 320, according to a schedule set by the particular programming service provider, broadcasts video and EPG data via the distribution network 372 to multiple customer premises. Each customer premise 380 has equipment for displaying programming events as well as the data associated therewith. For instance, customer premises 380 may have a TV 382 with an associated set top box 384. Most consumers will also have a VCR 385 and/or DVR 386. Likewise, especially as penetration of PCs into the home increases, consumer may have a PC 387 associated with the distribution network 370 as well as other consumer electronic devices located at customer premises 380. Skilled persons will recognize that TV 382 could incorporate the functionality of set top box 384. Similarly, as convergence of telecommunications, computing and broadcast equipment continues, PC 387 may also be the display device for displaying the various programming events selected by the subscribers as well as the data associated therewith provided by the transmission facility 315 over the distribution network 370.

Event Packaging:

Exemplary embodiments include a method for packaging programming events in which programming events are associated with one another in terms of content, channel, time, source of programming distribution or other parameters described below. Although some multi-event packages have been known before, exemplary embodiments allow programming providers to develop and deploy more varied and robust multi-event programming packages. In the past, such products could not be generated because subscribers could not access the information needed to describe and understand the product in view of the state of the existing programming guides that have been available.

Some of the packages that may be defined include the multi-event PPV packages that are described in Table 1 below:

| PACKAGE TYPE | PACKAGE DESCRIPTION |
| --- | --- |
| All-day by Title product | All-day by ticket products allow a subscriber to purchase a packaged product that enables the subscriber to watch a particular event over a specific time block continuously across one or more channels |
| All-day by Channel product | All-day by channel products allow a subscriber to watch a particular channel over a predetermined block of time regardless of the event being shown. |
| Multi-hour Series product | Multi-hour series products allow the subscriber to watch a single channel for a predetermined time containing several different events. |
| Season Ticket product | The season ticket products contain a selection of events over a relatively long period of time, such as a sports season, non-contiguously across one or more channels. |
| Weekend-Weekly-Biweekly Ticket Products | Weekend-Weekly-Biweekly ticket products enable a subscriber to watch a selection of events over a relatively short period of time, for example, a week, across one or more channels. |

Programming providers can associate events by a number of parameters including, as seen in Table 1, the title (event though the events channel and time block varies), multiple events based on similar channel, multiple events based on similar content, multiple event based on similar day, time and channel or multiple events based on reoccurrence over a set period, such as, over a weekend, weekly or bi-weekly. The process of association results in a richer variety of programming packages that are offered to subscribers.

Navigation of Guide Data:

FIG. 4 shows a screen face that may be seen by a subscriber. The Electronic Program Guide ("EPG") allows the subscriber to scroll through multi-event PPV packages instead of scrolling through each individual event. Within this first mode, regular and premium channels would be listed with event cells and only the channels containing multi-event PPV products would be displayed to the subscriber in a product wrapper. This capability relies on the EPG navigator's support of graphical display of multi-event package information, for example, a color coded or shaded product wrapper 20 surrounding associated events, as shown in FIGS. 4 through 14.

With reference to FIGS. 6-10, for an All-day by Title product, a product 100 is usually made up of multiple events 101-106. Events 101-106 are usually scheduled to play on contiguous channels, in a staggercast pattern. Staggercast means that the start times of the individual events are staggered so that a subscriber does not have to wait very long for the next event to begin. When the EPG is in the product navigation mode, the subscriber may scroll through an All-day title in one pass, using the remote's up and down navigation arrows, regardless of the number of events contained in that product. For example, with reference to FIGS. 6-8, if the subscriber pushed the down arrow once, he would move from package 100 to package 200. This is shown in FIG. 6 by the highlighted package wrapper of product 100. In FIG. 7, the wrapper for product 200 is highlighted because the subscriber navigated down to the next product. Once again, in FIG. 8, the wrapper for product 300 is highlighted. Thus, the product wrapper feature allows rapid scrolling through PPV products. The greater the number of All-day by Title events in a single product, the more rapidly a customer can find and select the product that they are interested in.

To highlight an individual event, the subscriber can, for example, double click the enter button to enter a hyperscroll mode. The hyperscroll mode is a second viewing mode that allows the subscriber to move from event to event within the product wrapper. For example, in FIG. 6, if the subscriber highlighted package 100 and then double clicked the enter button on the remote, the navigator would enter the hyperscroll mode and the wrapper for event 101 would become highlighted. This would allow the subscriber to pull up information specific to that event, including, for example: content data describing the event, scheduling data describing when that event will be played and the channel and pricing data explaining purchase price, individual event pricing or both. It would also allow the subscriber to select a single event for purchase within a PPV product.

All-day by Title products will typically shift downward in the channel lineup from day to day, to allow for newer titles to premier at the top of the PPV product listing. Therefore, scrolling to the right or left must account for the channel offset. Thus, if the same All-day by Title product for the next day were playing on a different group of channels, then scrolling to the right, would bring the subscriber to the next days product on a different group of channels, as is seen by comparing FIGS. 6 and 9. In the example illustrated therein, All-day by Title product of Titanic 100 is playing on channels 705-709 on Friday, and when the subscriber scrolls to the right to get to Saturday's All-day products, the next All-day by Title Product of Titanic is being shown on channels 708-712. Also, note that Products 200 and 300 also shifted in channel range from Friday's all-day product to Saturday's all-day product. However, if an All-day by Title product were aligned with the same channel range on a subsequent day, scrolling to the right would take the subscriber to the beginning time of the same product, which may typically start at 6 or 7:00 a.m., and play on the same channels on the subsequent day. Thus, no channel change would occur. Therefore, the navigation algorithm determines to which product to navigate. The options are: (1) Navigate to the same product, if it is available either on the same or on different channels; or (2) Navigate to the product occupying the first channel of the channel range of the previous product, if the previous product is not being offered on the subsequent day.

When the subscriber navigates to the beginning of a new product day, within the product mode, some events may not be visible, as seen in FIG. 9. At 6:00 a.m., the events on channels 710-712 are not shown because they are either in the previous day's product, or have not started within the present day's product due to the staggercast of the individual events within a product. Typically, there will be some straggling events from the previous day's product, and they should not appear in the current day's product. To see these events, the subscriber would need to switch to the hyperscroll event mode allowing the subscriber to scroll through each individual event wrapper. For this reason, the preferred scrolling option would be to move to the same channel lineup in the subsequent day.

All-day by Channel and Multi-hour Series products operate in a straightforward manner, since they occupy only one channel. All-day by Channel products can either be (1) the same event playing all day or (2) multiple events playing on a single channel. Thus, navigation is quite simple: scrolling to the right in the EPG grid takes the subscriber to the start time of the next product on that channel, usually 6:00 a.m. of the next day. Multi-hour Series packages, as shown in FIG. 4, would operate the same as All-day by Channel since it is played on a single channel. Thus, if the subscriber navigates to the right, in the EPG grid, it would take her or him to the next product start time, which could occur either in the same day or during a subsequent day, depending upon the length of the product. As with the prior products, if the subscriber wants to navigate through the individual events that make up one of these two products, they must double click the enter button to engage the hyperscrolling mode. This mode is extremely useful with multi-hour and all-day by channel products because it allows the subscriber to select specific events within the product and also gives the subscriber the ability to bring up information pertaining to the individual events contained in the multi-event product.

Other multi-event PPV products are the Season Ticket product, Weekend Ticket product and Weekly Ticket product. With reference to FIGS. 11-14, a Weekly Ticket product event 401 is shown on channel 780. A second product event 402 is shown on channel 782 starting at the end of event 401. As seen from the example in FIG. 11, Multi-event PPV products present other challenges because the events can be offered on different channels, on different days, and at different times. Consequently, the events within the multi-event product would show up on different EPG pages. To account for these problems, a second new viewing mode, the collapsed hyperscroll mode, brings together those channels that are associated with a given product.

Figure 12:
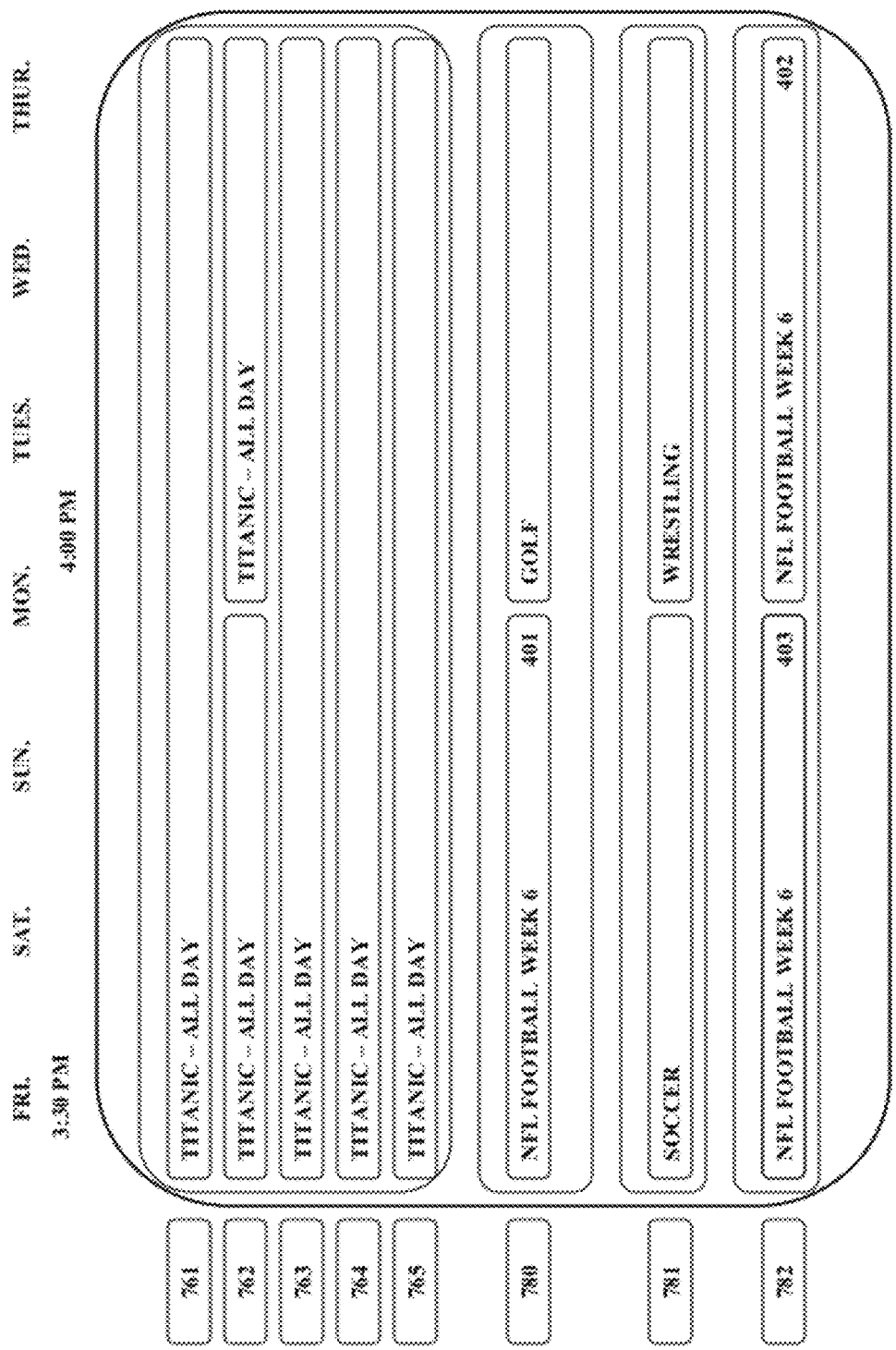
FIG. 12 is the EPG grid of FIG. 9 with the Weekly Ticket package being selected.

For example in FIG. 12, when a subscriber scrolls in the product mode, to event 401 of a Weekly Ticket product, the EPG recognizes that the product contains non-contiguous events in the channel domain and/or non-contiguous event start times in the time domain. The subscriber is prompted to switch to a collapsed hyperscroll view of this product by pressing a button on the remote control.

Figure 13:
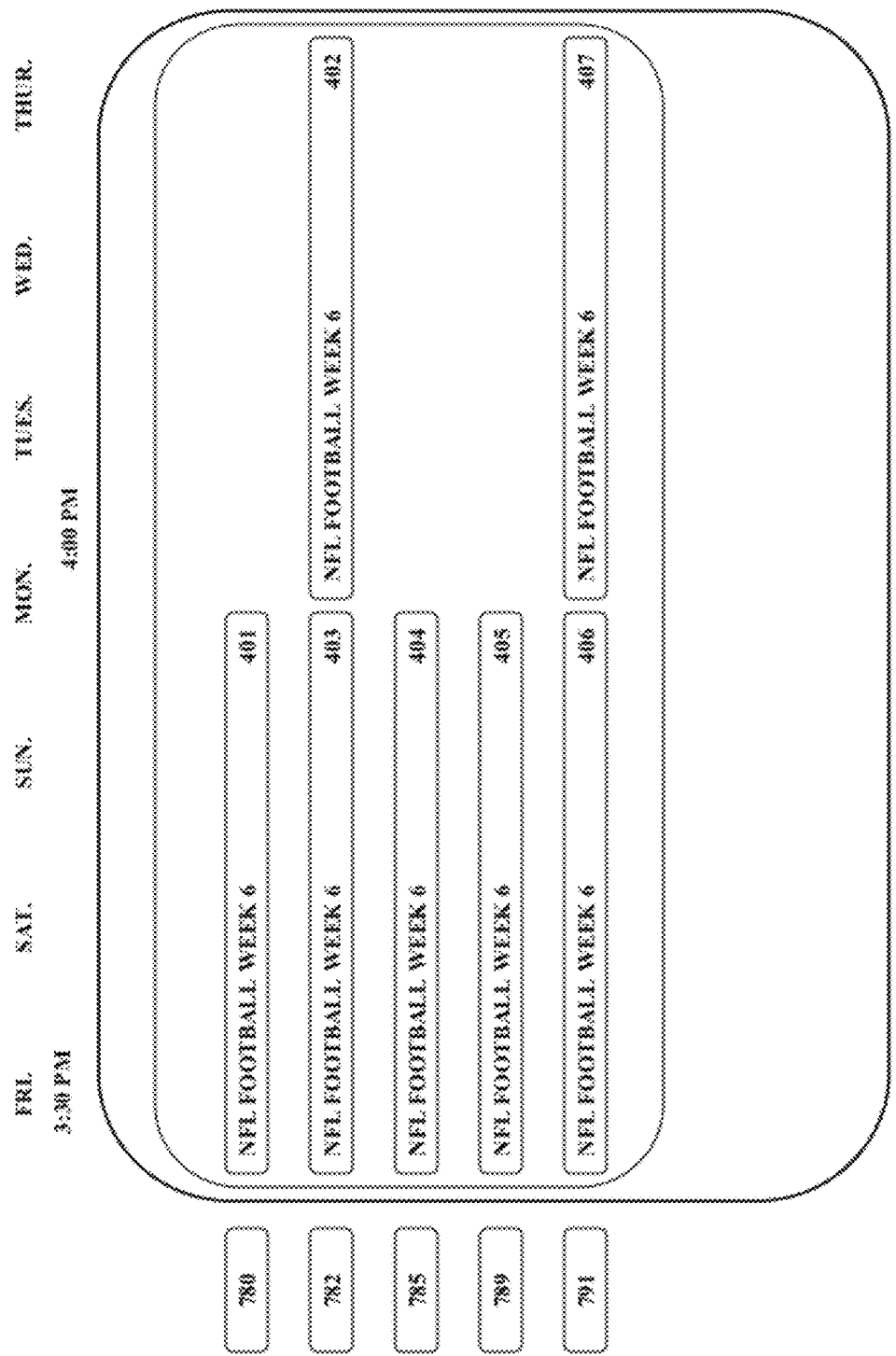
FIG. 13 is the EPG grid of FIG. 9 in the hyperscroll mode, which allows the subscriber to have a collapsed view of the events contained in the Weekly Ticket product and scroll through each separate event.
Figure 14:
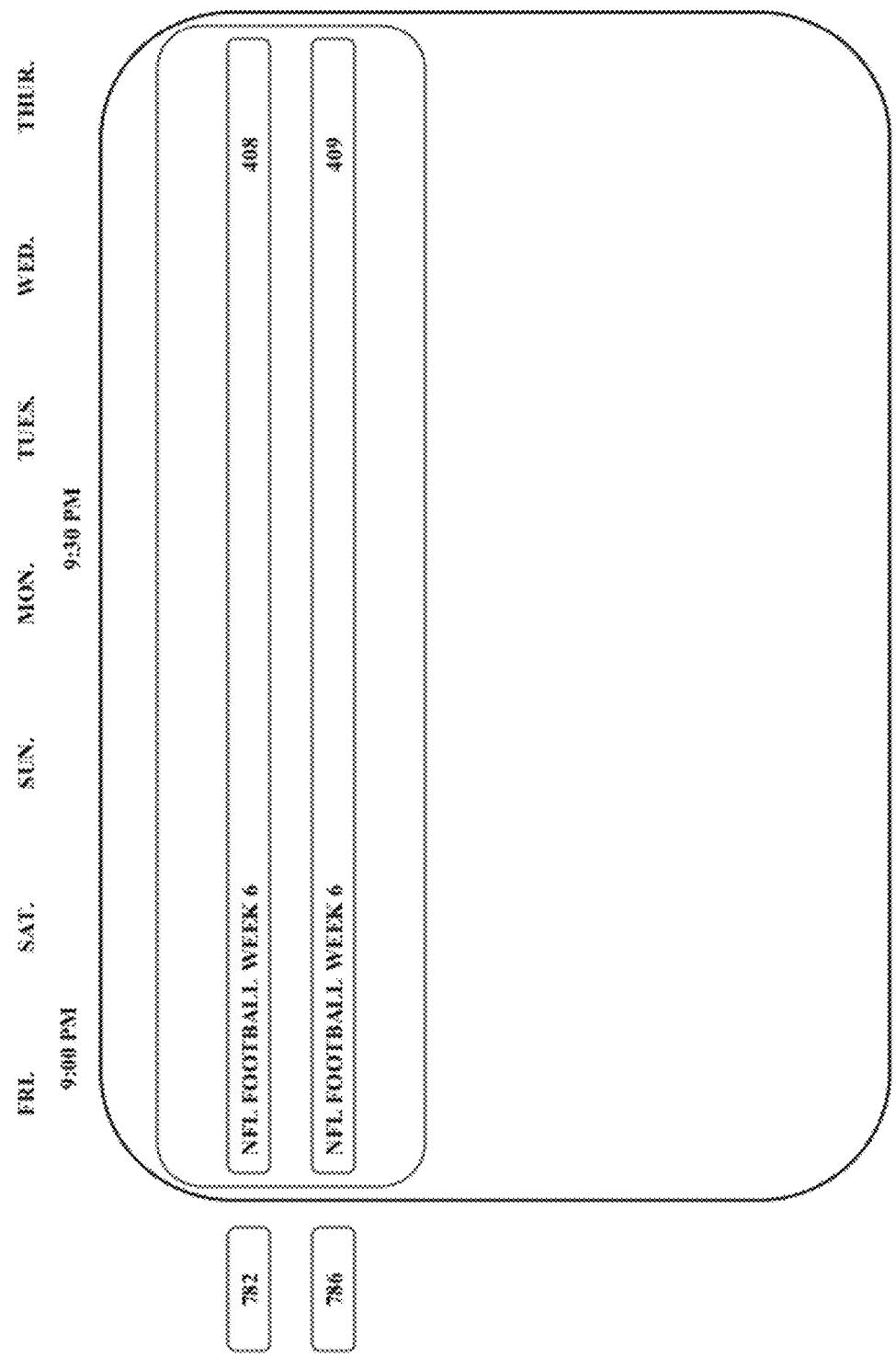
FIG. 14 is a view of the hyperscroll mode of FIG. 11 time shifted forward to the Monday of the following week.

In the collapsed mode, shown in FIG. 13, only the channels and times with events 401-407 in this product are displayed. The collapsed mode allows the subscriber to plan which events he would like to view or video tape without having to scroll through all the times and channels looking for events within this product. As depicted in FIG. 14, scrolling to the right in the EPG grid, within the collapsed hyperscroll mode navigates to the next time and channel that contains an event within the product. Referring back to FIG. 13, although not shown, if more events are playing during the 3:30 p.m. time slot, but are unable to be displayed due to space constraints, the EPG display would prompt the subscriber to navigate up, down, right or left to the additional events. The collapsed mode provides large degrees of subscriber navigation flexibility through these types of time-dispersed and channel-dispersed multi-event PPV products.

Figure 15:
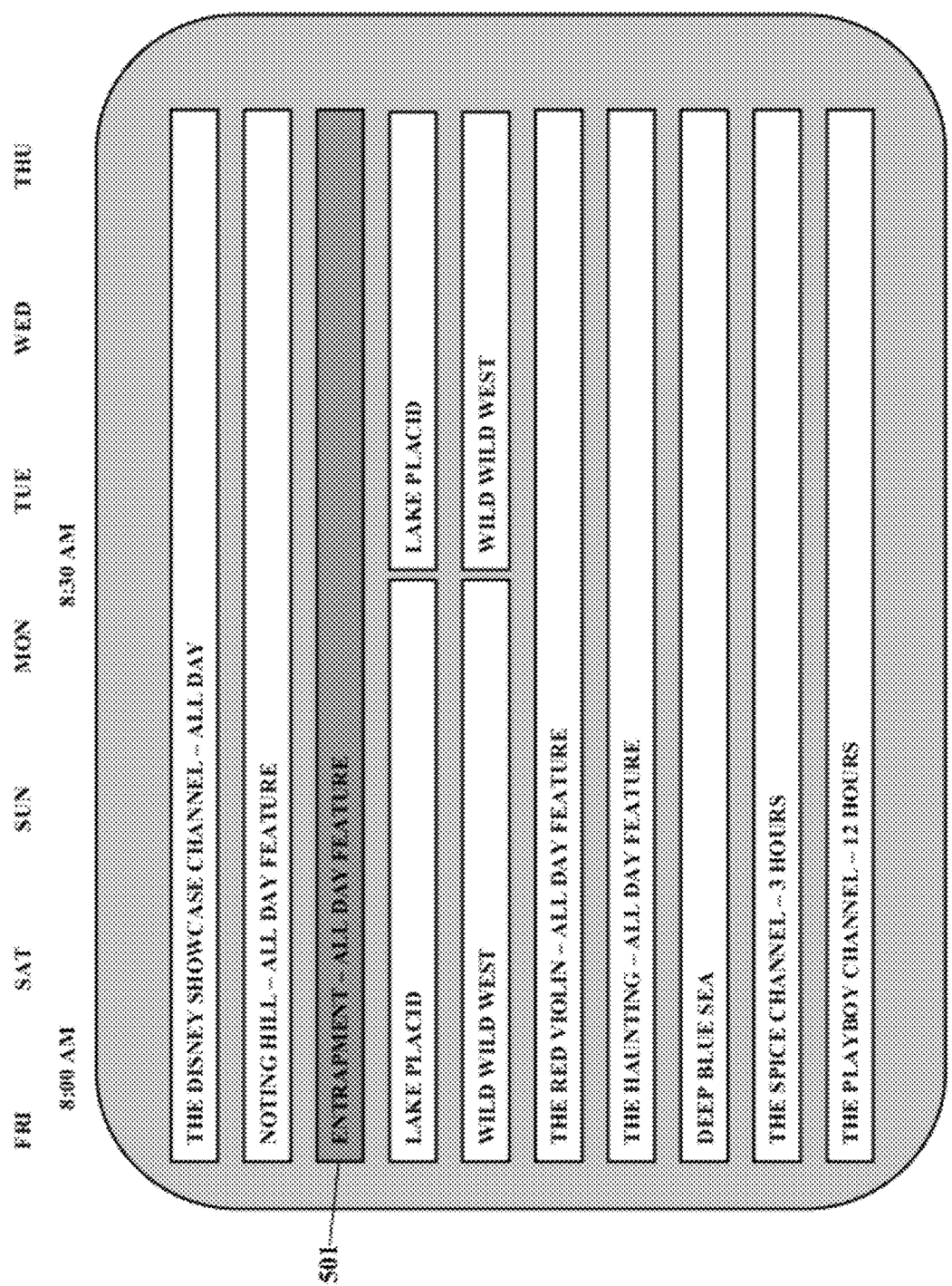
FIG. 15 is a view of another embodiment of the EPG grid, which allows a user to scroll and expand a PPV package.
Figure 16:
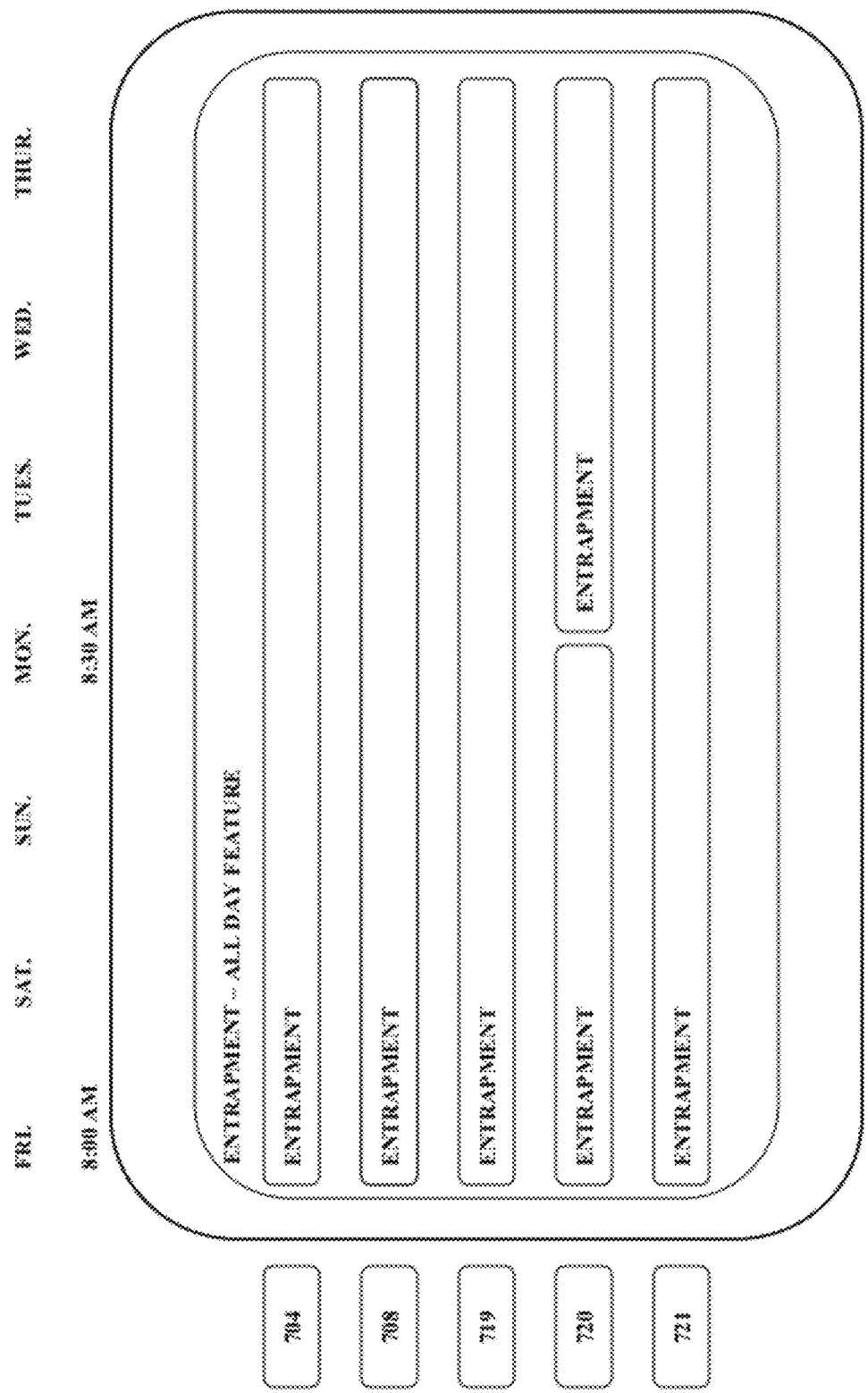
FIG. 16 is an expanded view of a PPV package in the EPG grid of FIG. 15.
Figure 17:
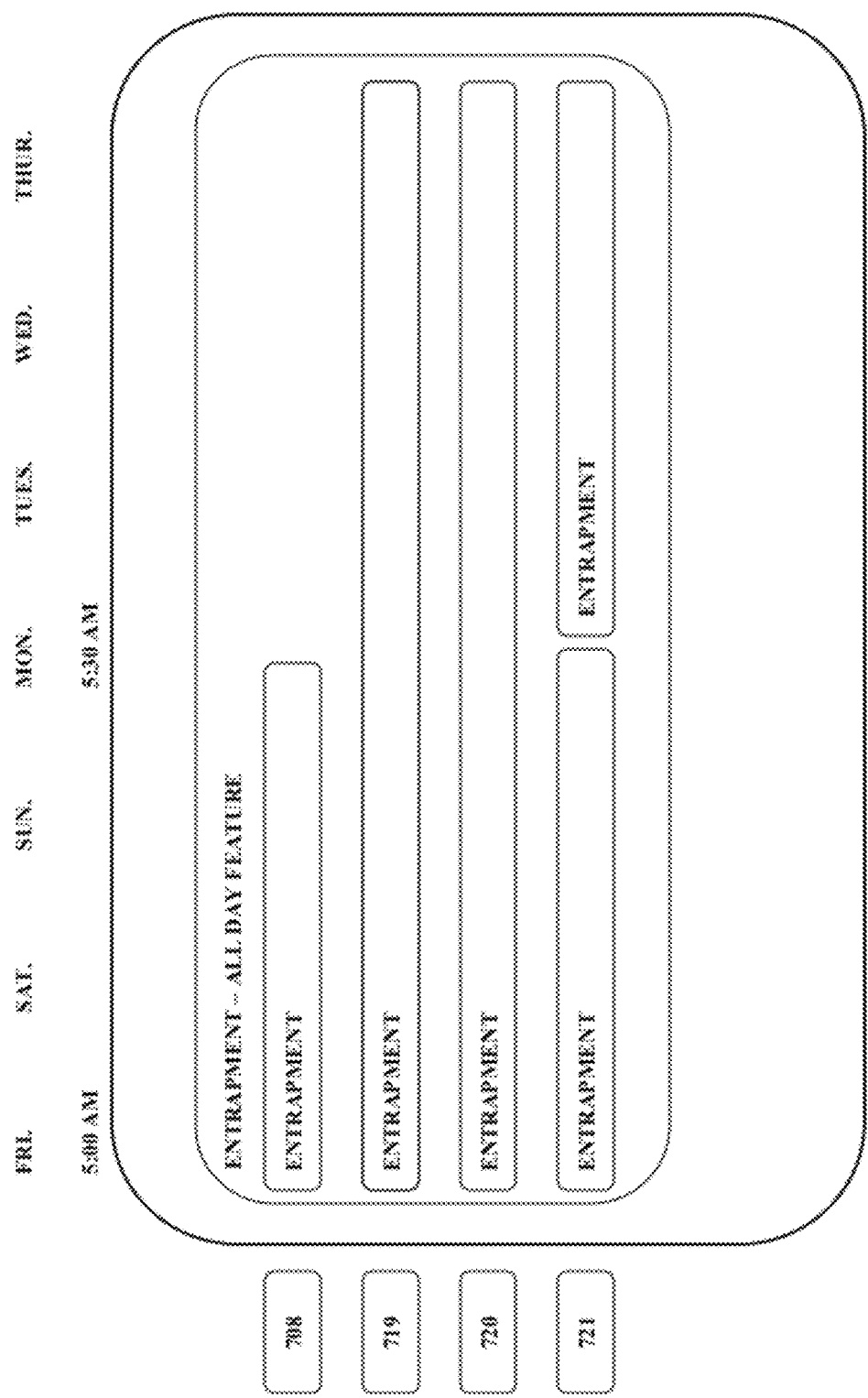
FIG. 17 is the expanded view of FIG. 16 time shifted forward in time.

In another exemplary embodiment, a zoom mode is used to view the PPV events within a product. Here, moving the cursor will only highlight a package (outer wrapper) and will not highlight individual events within the package unless the subscriber presses a Zoom In/Out key that switches the cursor from the package mode to an expanded event mode. As seen in FIG. 15, channel numbers are not displayed when viewing the PPV products. When a product is selected, for example, Entrapment 501, the user may enter a zoom mode that expands the selected product to display the individual events, as shown in FIG. 16. The grid times remain the same as in the previous collapsed mode. The days shown on the top of the grid will indicate only the applicable days of the current product. The zoom mode easily accommodates non-contiguous channel scheduling. As shown in FIG. 17, as the user scrolls to the right, additional programming that is part of the product is displayed. Within this expanded mode, pressing the arrow buttons move the subscriber from event to event in the expanded screen view. This allows the subscriber to purchase or pull up information regarding each individual event. To exit the expanded mode, the subscriber presses the zoom button once more and is returned to the product mode.

In yet another exemplary embodiment, the user can scroll through the EPG grid using the up/down and left/right buttons on the remote control. Once the user reaches the multi-event PPV products the first movement on to a package highlights the package wrapper. For example, in FIG. 6, once the user moves down and highlights package 100 the next down arrow keystroke will move the user onto individual event 101. A second down keystroke will highlight individual event 102 and a third keystroke to 104, etc. Once event 106 has been reached, an additional down arrow keystroke will highlight package 200. Thus, it can be seen that the arrow keys are all that is necessary for selecting packages or individual events within a package. The left and right arrow keys perform similar functions. For example, in FIG. 6, if event 102 is highlighted, a right arrow keystroke will cause event 103 to be highlighted. Each successive right arrow keystroke will cause the next event within the package to become selected until the last event in the package is reached. Once the last event in a package is reached, the next arrow keystroke will cause the adjacent package wrapper to become selected.

Implementation of EPG and Navigator Functionality:

The EPG and navigator functionality described above may be implemented in various hardware and software configurations. For instance, the EPG may be implemented as a software module within a set top box, such as STB 384 associated with TV 382, as shown in FIG. 3. Alternatively, the EPG may be integrated with the functionality of TV 382 provided with an appropriate processor and memory for storing EPG guide data. Likewise, as convergence continues, the EPG and navigator functionality may be implemented within PC 387.

Figure 18:
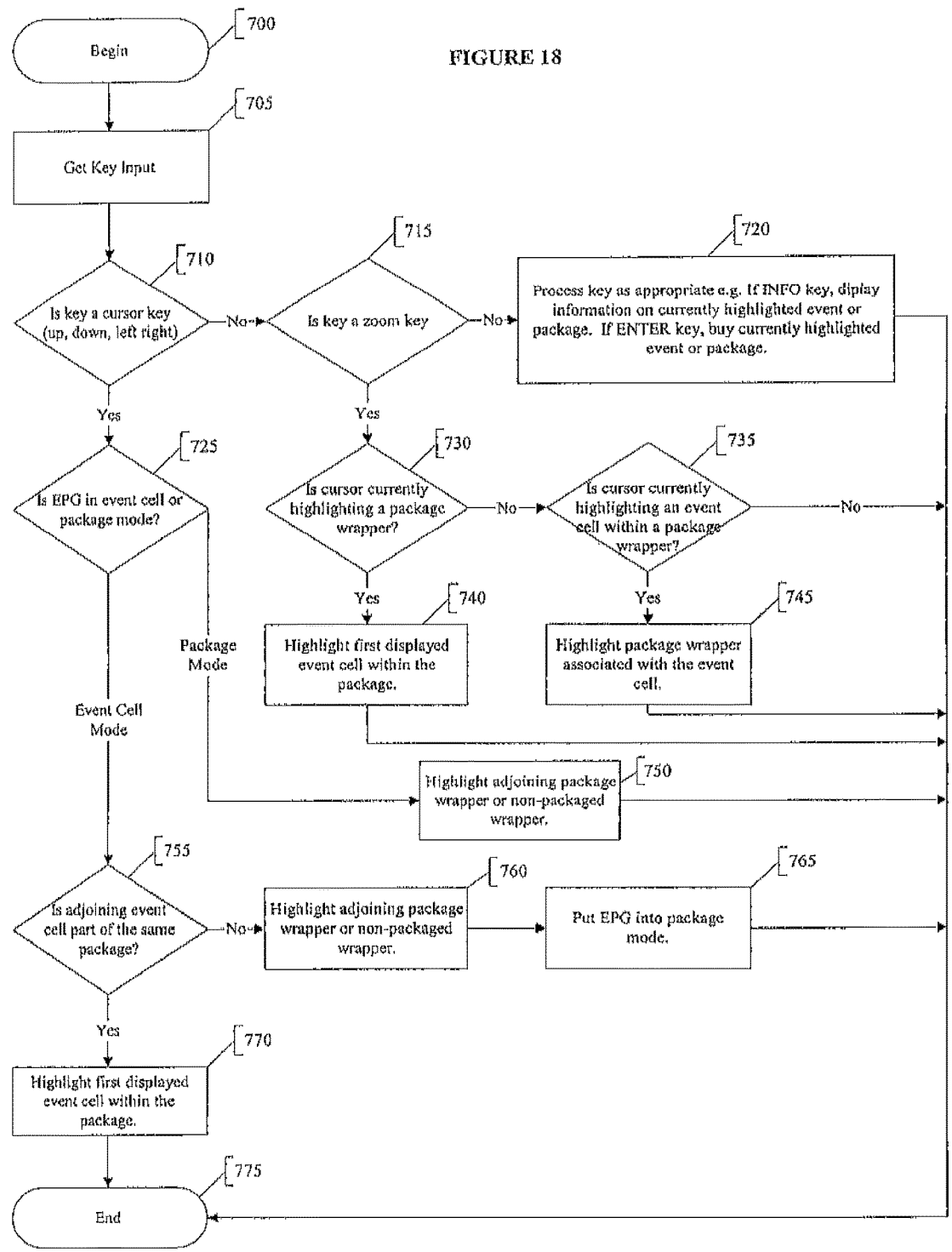
FIG. 18 is a process flow diagram of the preferred embodiment.

Regardless of where implemented, the EPG and navigator functionality may comprise a software module carrying out the process of steps shown in FIG. 18. At step 700, the process begins by the user pressing a keystroke on the control device. The keystroke is detected at step 705. At step 710, the system must determine if the detected keystroke is a cursor key, for example, a up, down, left, or right arrow key.

At 725, if the keystroke is a cursor key the program next determines whether the system is in the event cell or package mode. At step 755, if the system is in the event cell mode (hyperscroll mode) the system next determines if the next event to be selected is part of the same package or part of a different package. If the adjoining cell is part of the same package, at step 770, the system will highlight the next displayed event cell within the package in the direction represented by the cursor key. However, at step 755, if the adjoining event cell is not part of the same package, then at step 760 the system will highlight the adjoining package wrapper or non-packaged wrapper in the direction of the depressed cursor key, for example, left, right, up or down. In addition to highlighting the adjoining package wrapper, the system, at step 765, exits the event cell mode (hyperscroll mode) placing the EPG system back into the package mode. The process ends at step 755 and the system awaits another keystroke. Alternatively the system can remain in the event cell mode and additional cursor keystrokes navigates through the EPG at the event cell level.

Looking back to step 725, if the system was in the package mode instead of the event cell mode when the cursor key was pressed, at step 750, the adjoining package wrapper or non packaged wrapper becomes highlighted. This, allows the user to navigate from package to package in the EPG reducing the amount of time necessary to scan through the EPG. Thereafter, the process ends and the system awaits for the next keystroke.

Referring back to step 710, if a cursor key is not depressed, at step 715, the system next determines if the keystroke was the zoom key. At step 720, if the key depressed was not the zoom key, the system processes the keystroke and carries out the function associated with the keystroke. For example, if the enter key for buying the selected programming is depressed the currently highlighted event is purchased and displayed to the viewer.

Alternatively, at step 715, if the zoom key is depressed, at step 730, the system determines whether the system is currently highlighting a package wrapper. In effect, the system is checking whether it is currently in the package mode or the event cell mode (hyperscroll/zoom mode). At step 735, if the system is in the event cell mode (hyperscroll/zoom mode) and not highlighting an event cell within a package wrapper, the process ends at step 775. However, if a event cell is being highlighted at step 735, the system, at step 745, will exit the event cell (hyperscroll/zoom) mode and highlight the package wrapper associated with the event cell that was selected, thus ending the process.

On the other hand, at step 730, if the system is currently highlighting a package wrapper because it is in the package mode, at step 740, the system will highlight the first displayed event cell within the current selected package. Thus, the system enters the event cell (hyperscroll/zoom) mode. The process then ends at step 775 and awaits another keystroke.

Figure 19:
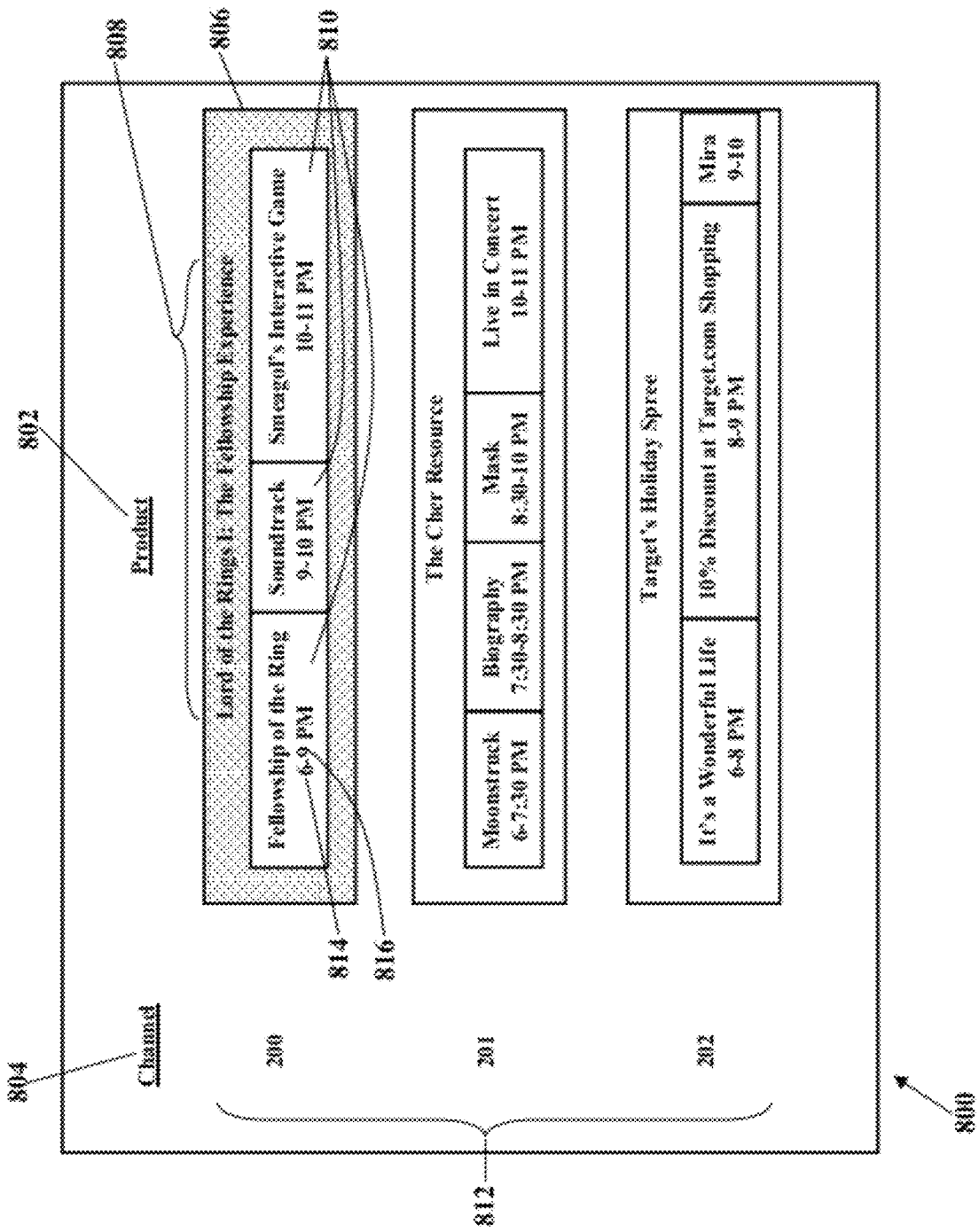
FIG. 19 is a schematic further illustrating an electronic program guide 800, according to more exemplary embodiments.

FIG. 19 is a schematic further illustrating an electronic program guide 800, according to more exemplary embodiments. FIG. 19 illustrates that product packages and/or their events may comprise any type of media. That is, each product and its associated events need not only be video offerings. The products and events may comprise music, games, software applications, pictures, and even locally-stored content. FIG. 19, for example, illustrates product offerings 802 according to channel 804. Channel 200 offers a "Lord of the Rings" product 806. The product 806 simultaneously lists a wrapper 808 and the product's associated events 810. The wrapper 808 visually and/or audibly presents a relationship between the events 810 with the product 806. Here the wrapper 808 explains that channel 200 presents the product entitled "Lord of the Rings I: The Fellowship Experience." The wrapper 808 associates or otherwise generically relates the individual events to one another. Channel 200, for example, allows the subscriber to view the movie "Fellowship of the Ring," listen to or watch its corresponding soundtrack, and then play "Smeagol's Interactive Game." Here, then, the product 806 and its associated events 810 comprise a movie, music, and a game. Either event 810 may be streamed to the subscriber's set-top box or other media device, and/or portions of either event may be downloaded and locally stored in memory. Some portions or all of "Smeagol's Interactive Game," for example, may be downloaded and stored to memory in the subscriber's set-top box or other media device.

FIG. 19 also illustrates the simultaneous listing of time information, according to still more exemplary embodiments. The electronic programming guide 800 has a programming grid 812 that simultaneously lists a start time 814 and a stop time 816 of each event 810 within each product 806. Using channel 200 as an example, the movie "Fellowship of the Ring" is transmitted/received from 6-9 PM, the corresponding soundtrack is cast from 9-10 PM, and "Smeagol's Interactive Game" may be played from 10-11 PM.

The events need not be bound by time constraints. Although FIG. 19 illustrates the simultaneous listing of time information, the individual events within each product are not bound by specific time constraints. That is, although FIG. 19 illustrates that the "Fellowship of the Ring" soundtrack is cast from 9-10 PM, the soundtrack could be offered on demand. "Smeagol's Interactive Game," too, may be offered on demand. Any of the individual events within each product may be offered on a demand basis. Any of the products, and/or a product's individual events, may be offered on a demand basis, whenever the subscriber wishes to access.

Figure 20:
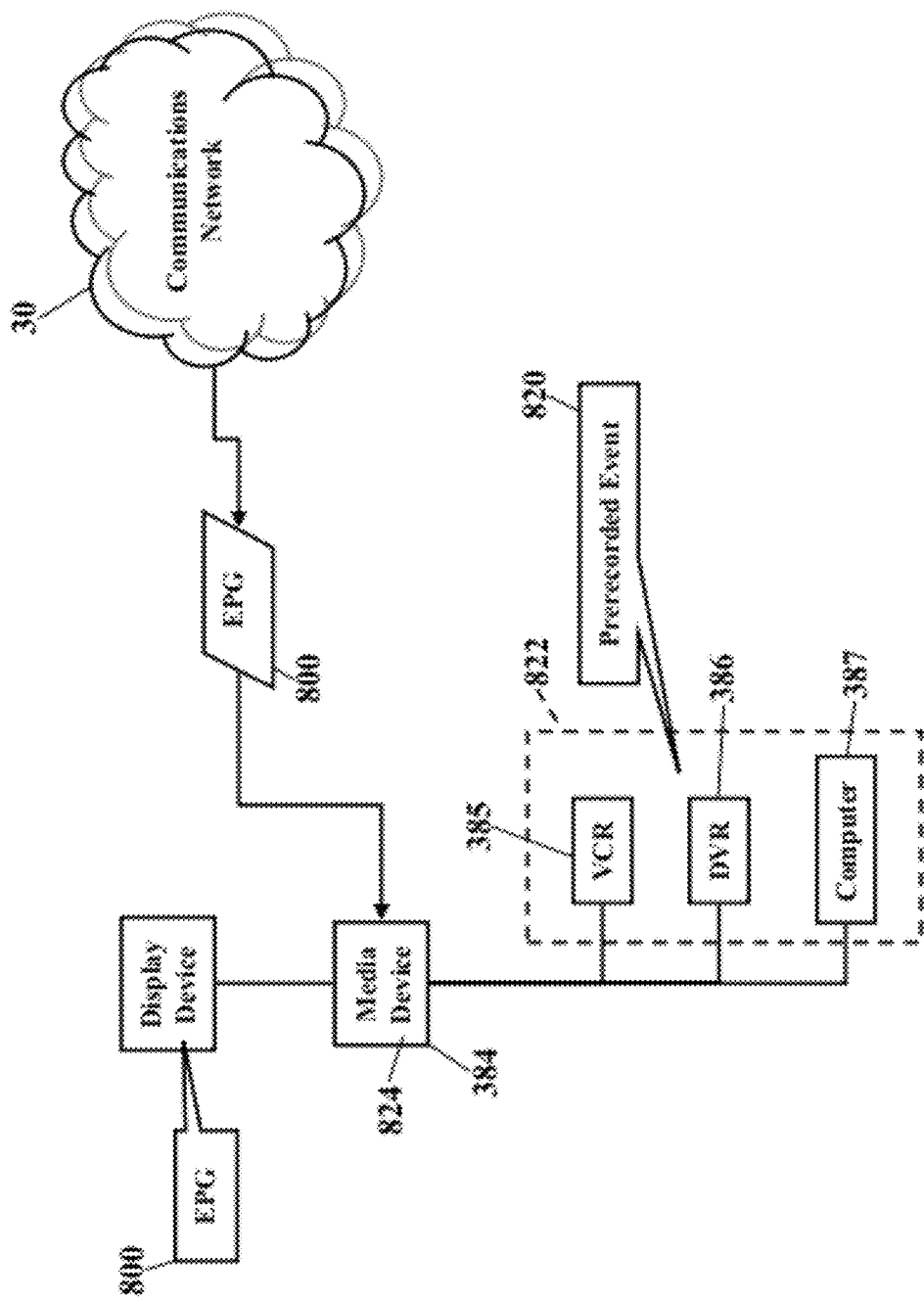
FIG. 20 is a schematic that illustrates linking prerecorded events, according to still more exemplary embodiments.

FIG. 20 is a schematic that illustrates linking prerecorded events, according to still more exemplary embodiments. Here the subscriber's media device (such as the set-top box 384) may access a prerecorded event 820 stored in some local memory location 822. The electronic programming guide ("EPG") 800 may then associate or link that prerecorded event 820 to at least one of a product, an event, and/or the wrapper. FIG. 20 illustrates that any product, event, or wrapper need not be time-based. That is, the electronic programming guide 800 could list content stored on the digital video recorder 386, stored on the computer 387, or even stored in memory 824 of the media device (such as the set-top box 384). Content from the VCR 385 could also be accessed and linked. The electronic programming guide 800 could also link content from any other storage or retrieval device, such as a DVD player and an .mp3/4 device. These prerecorded events are linked, through some linkage of classification of the type of event, to products or events or wrappers. When the electronic programming guide is expanded the subscriber possibly sees a listing of time-based events that will be broadcast in the future. The subscriber might additionally or alternatively see a list of prerecorded events that are stored in the local memory location 822 that are instantly viewable. The subscriber might additionally or alternatively see a list of music files or games or other assets that may be downloaded, or previously downloaded, and available as a part of that product or as a part of that event.

The product need not be purchasable. When the electronic programming guide is expanded, the subscriber sees all of the included assets as part of that event or product. Those assets, however, need not be a purchasable product. The assets could a complimentary and provided based on the product or package. The exemplary embodiments, then, need not comprise solely pay-per-view products. A product may contain events that are not time-based and not necessarily video.

Figure 21:
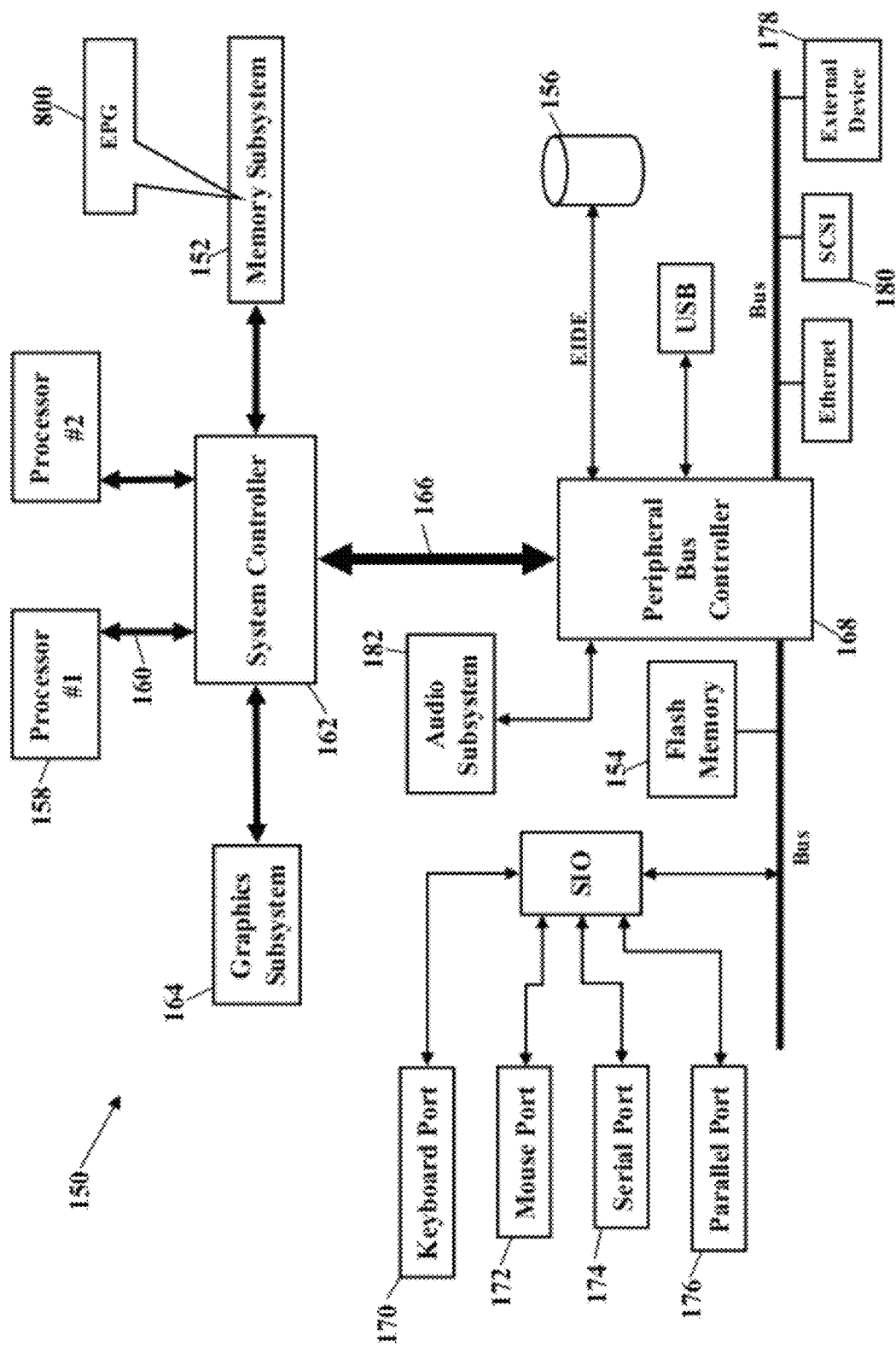
FIG. 21 depicts a possible operating environment for exemplary embodiments.

FIG. 21 depicts a possible operating environment for exemplary embodiments. FIG. 21 is a block diagram showing the electronic programming guide ("EPG") 800 residing in a processor-controlled system 150 (such as the media device or the set-top box 384). FIG. 21, however, may also represent a block diagram of any computer or communications device in which the electronic programming guide 800 may be processed. The electronic programming guide 800 stores within a system memory device. The electronic programming guide 800, for example, is shown residing in a memory subsystem 152. The electronic programming guide 800, however, could also reside in flash memory 154 or peripheral storage device 156. The processor-controlled system 150 also has one or more central processors 158 executing an operating system. The operating system, as is well known, has a set of instructions that control the internal functions of the computer system 150. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and external hard drive ports 180 (such as IDE, ATA, SATA, or SCSI). The Peripheral Bus Controller 168 could also include an audio subsystem 182. Those of ordinary skill in the art understand that the program, processes, methods, and systems described herein are not limited to any particular computer system or computer hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS® (WINDOWS® is a registered trademark of Microsoft Corporation, One Microsoft Way, Redmond Wash. 98052-6399, 425.882.8080, www.Microsoft.com) operating systems may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical User Interface (GUI). The Graphical User Interface typically includes a combination of signals communicated along the keyboard port 170 and the mouse port 172. The Graphical User Interface provides a convenient visual and/or audible interface with a subscriber of the processor-controlled system 150.

Figure 22:
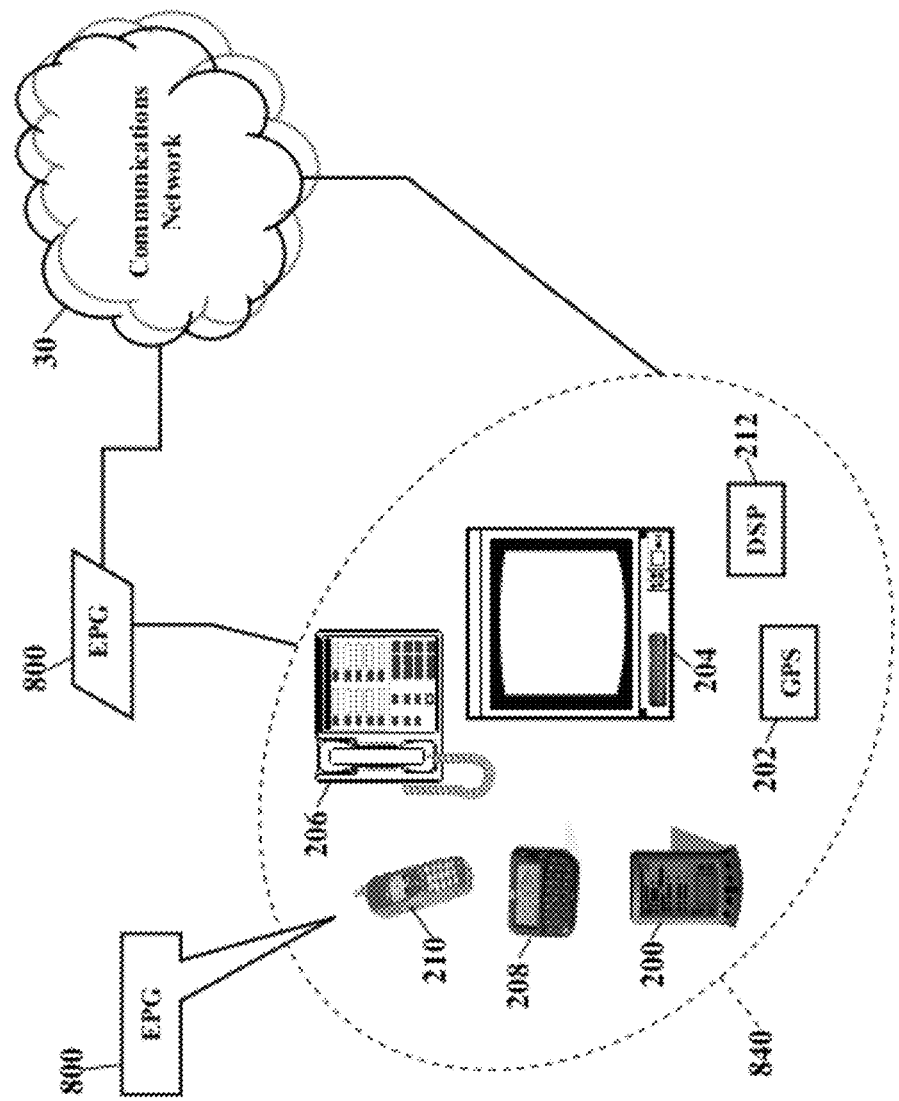
FIG. 22 is a schematic illustrating an electronic programming guide operating within various other media devices, according to still more exemplary embodiments.

FIG. 22 is a schematic illustrating still more exemplary embodiments. FIG. 22 illustrates that the electronic programming guide 800 may alternatively or additionally operate within various other media devices 840. FIG. 22, for example, illustrates that the electronic programming guide 800 may entirely or partially operate within a personal digital assistant (PDA) 200, a Global Positioning System (GPS) device 202, an interactive television 204, an Internet Protocol (IP) phone 206, a pager 208, a cellular/satellite phone 210, or any computer system and/or communications device utilizing a digital signal processor (DSP) 212. The media device 840 may also include watches, radios, vehicle electronics, clocks, printers, gateways, and other apparatuses and systems.

Figure 23:
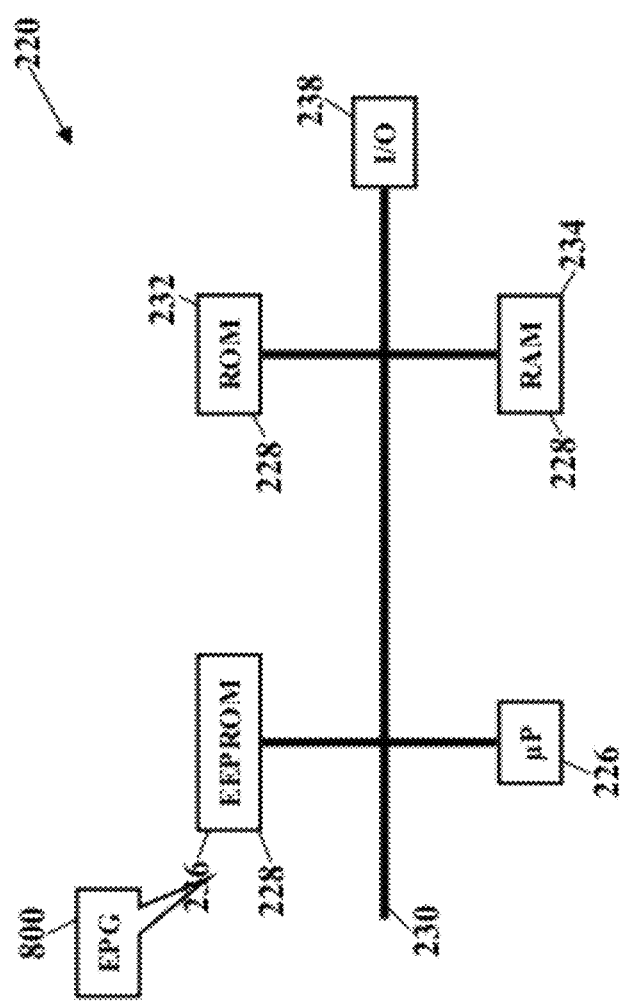

FIGS. 23-25 are schematics further illustrating various other media devices for providing programming, according to the exemplary embodiments. FIG. 23 is a block diagram of a Subscriber Identity Module 220, while FIGS. 24 and 25 illustrate, respectively, the Subscriber Identity Module 220 embodied in a plug 222 and the Subscriber Identity Module 220 embodied in a card 224. As those of ordinary skill in the art recognize, the Subscriber Identity Module 220 may be used in conjunction with many media devices (such as the media devices 840 shown in FIG. 22). The Subscriber Identity Module 220 stores subscriber information (such as the subscriber's International Mobile Subscriber Identity, the subscriber's $K_i$ number, and other subscriber information), perhaps the subscriber's profile (shown as reference numeral 108), and any portion of the sampling application 20. As those of ordinary skill in the art also recognize, the plug 222 and the card 224 each interface with the communications device according to GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Char-*

*acteristics* (GSM 02.17 V3.2.0 (1995-01))." The GSM Standard 11.11 is formally known as "Digital cellular telecommunications system (Phase 2+) (GSM); *Specification of the Subscriber Identity Module—Mobile Equipment (Subscriber Identity Module—ME)* interface (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "*Information technology—Identification cards—Integrated circuit(s) cards with contacts*," and the standard is available from the International Organization for Standardization (ISO) (1, rue de Varembé, Case, postale 56CH-1211 Geneva 20, Switzerland, Telephone +41 22 749 01 11, Telefax +41 22 733 34 30, www.iso.org).

FIG. 23 is a block diagram of the Subscriber Identity Module 220, whether embodied as the plug 222 of FIG. 24 or as the card 224 of FIG. 25. Here the Subscriber Identity Module 220 comprises a microprocessor 226 (μP) communicating with memory modules 228 via a data bus 230. The memory modules may include Read Only Memory (ROM) 232, Random Access Memory (RAM) and or flash memory 234, and Electrically Erasable-Programmable Read Only Memory (EEPROM) 236. The Subscriber Identity Module 220 stores some or all of the EPG 800 in one or more of the memory modules 228. FIG. 23 shows the EPG 800 residing in the Erasable-Programmable Read Only Memory 236, yet the EPG 800 could alternatively or additionally reside in the Read Only Memory 232 and/or the Random Access/Flash Memory 234. An Input/Output module 238 handles communication between the Subscriber Identity Module 220 and the media device. As those skilled in the art will appreciate, there are many suitable ways for implementing the operation and physical/memory structure of the Subscriber Identity Module. If, however, the reader desires more information on the Subscriber Identity Module, the reader is directed to the following sources: Lawrence Harte et al., GSM Superphones 99-100, 113-14 (1999); Siegmund Redl et al., GSM and Personal Communications Handbook 303-69 (1998); and Joachim Tisal, GSM Cellular Radio Telephony 99-130 (1997), with each incorporated herein by reference.

Figure 26:
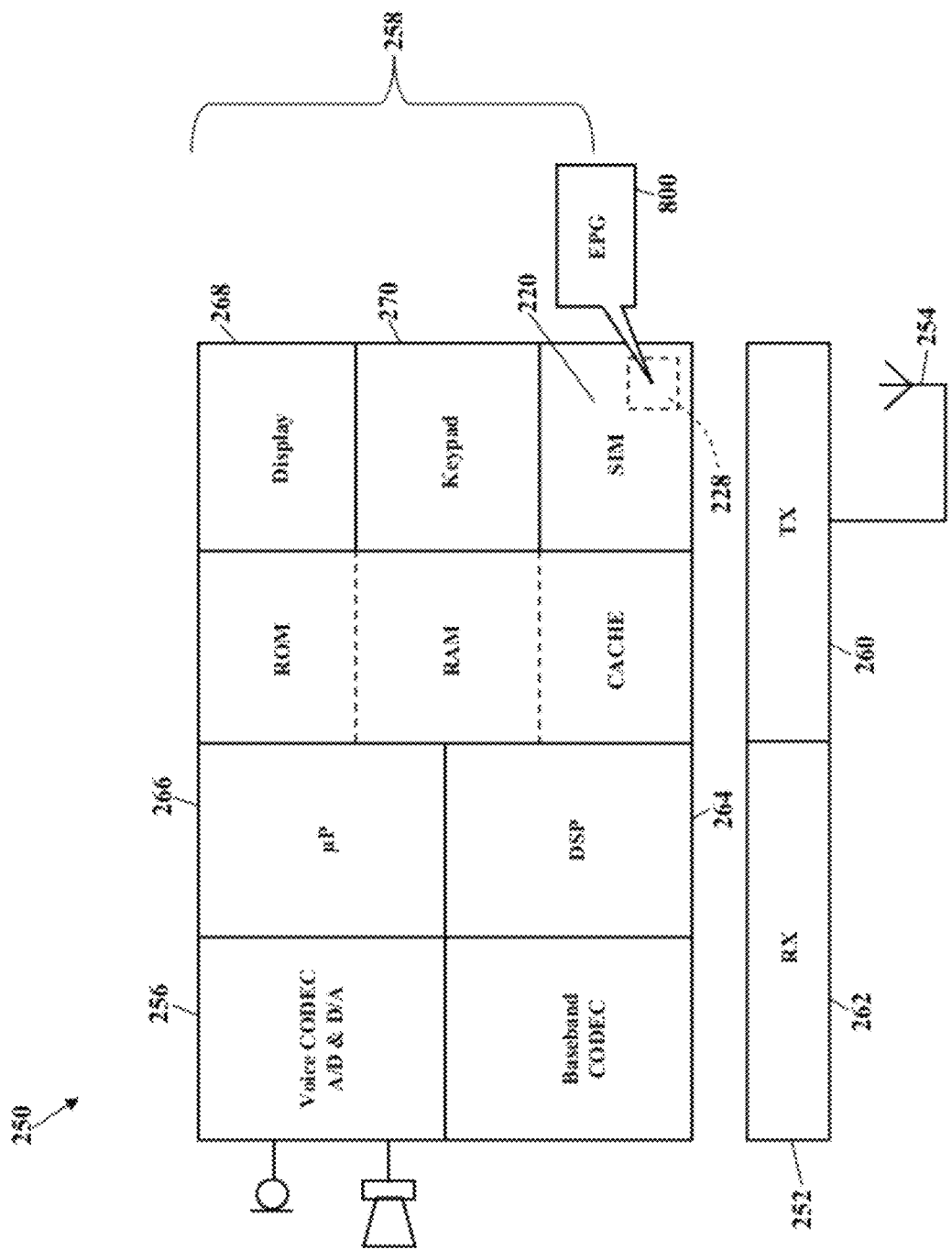

FIG. 26 is a schematic further illustrating various media devices for providing programming, according to the exemplary embodiments. FIG. 26 is a block diagram of another media device 250 utilizing any portion of the EPG 800. In one embodiment, the media device 250 comprises a radio transceiver unit 252, an antenna 254, a digital baseband chipset 256, and a man/machine interface (MMI) 258. The transceiver unit 252 includes transmitter circuitry 260 and receiver circuitry 262 for receiving and transmitting radio-frequency (RF) signals. The transceiver unit 252 couples to the antenna 254 for converting electrical current to and from electromagnetic waves. The digital baseband chipset 256 contains a digital signal processor (DSP) 264 and performs signal processing functions for audio (voice) signals and RF signals. As FIG. 26 shows, the digital baseband chipset 256 may also include an on-board microprocessor 266 that interacts with the man/machine interface (MMI) 258. The man/machine interface (MMI) 258 may comprise a display device 268, a keypad 270, and the Subscriber Identity Module 220. The on-board microprocessor 266 performs GSM protocol functions and control functions for the radio circuitry 260 and 262, for the display device 268, and for the keypad 270. The on-board microprocessor 266 may also interface with the Subscriber Identity Module 220 and with the EPG 800 residing in the memory module 228 of the Subscriber Identity Module 220. Those skilled in the art will appreciate that there may be many suitable architectural configurations for the elements of the media device 250. If the reader desires a more detailed explanation, the reader is invited to consult the following sources: Lawrence Harte et al., GSM Superphones 105-120 (1999); Siegmund Redl et al., GSM and Personal Communications Handbook 389-474 (1998); and Joachim Tisal, GSM Cellular Radio Telephony 99-130 (1997), with each incorporated herein by reference.

The EPG 800 may be utilized regardless of signaling standard. As those of ordinary skill in the art recognize, FIGS. 23-26 illustrate a Global System for Mobile (GSM) media device. That is, the media device utilizes the Global System for Mobile (GSM) communications signaling standard. Those of ordinary skill in the art, however, also recognize the EPG 800 is equally applicable to any media device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

Figure 27:
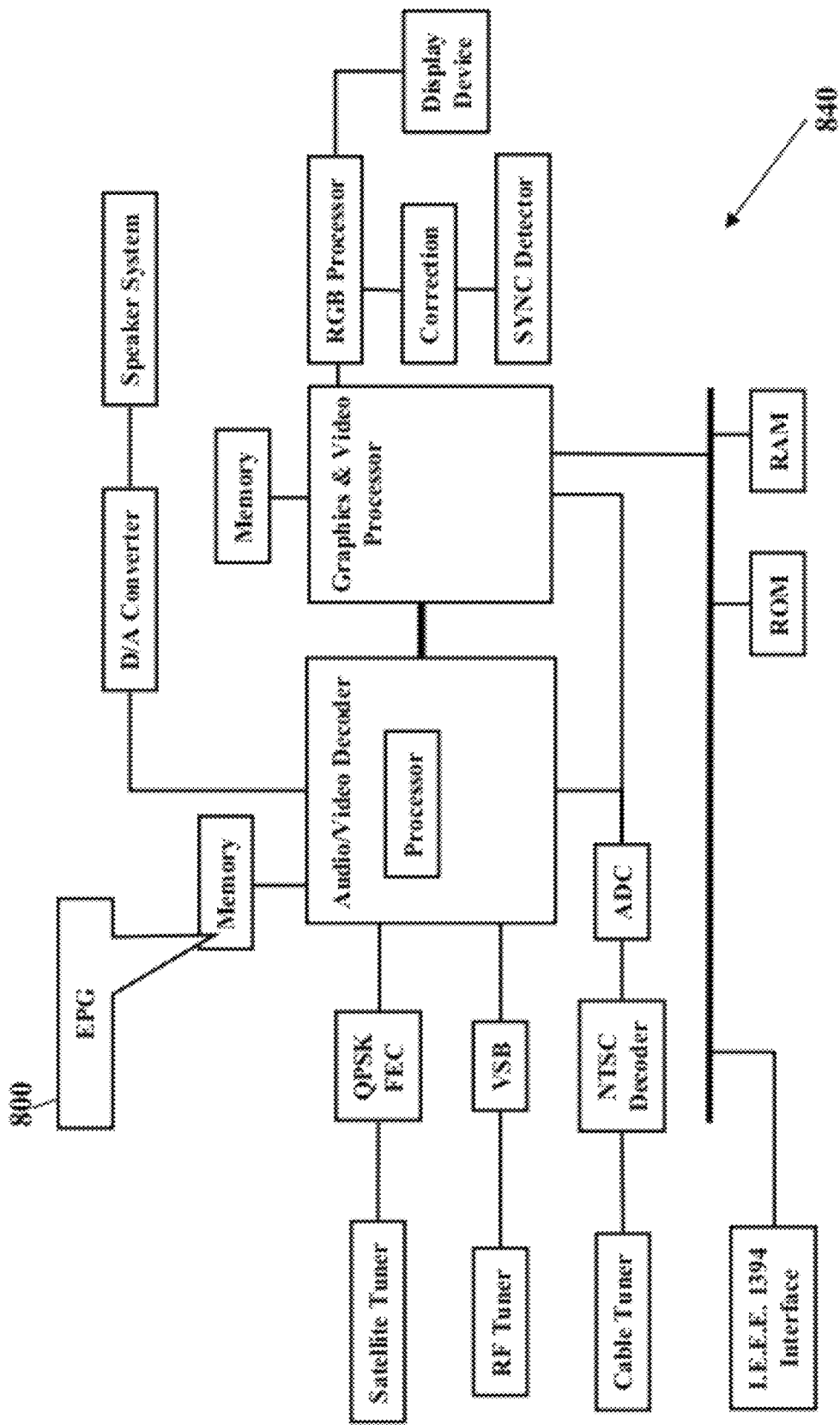

FIG. 27 is a block diagram further illustrating the media device 840, according to yet more of the exemplary embodiments. Here the media device 840 is shown as a digital high definition television (HDTV) system. Although an HDTV system is shown, the exemplary embodiments are applicable to any television design. The concepts, for example, are applicable to analog circuitry, digital circuitry, analog signals, and/or or digital signals. The television may include an encoder/decoder, such as an embedded set-top box. The term "television," however, may encompass a stand-alone set-top box that is a separate component from the television. The television may also utilize any display device technology, such as a cathode-ray, a liquid crystal, a diode, digital micromirror, light processor, or plasma. The EPG 800 may be stored in any memory location or device in the television. FIG. 27, though, is only a simplified block diagram. The operating and engineering principles are already known in the art and will not be repeated here. If, however, the reader desires more information on the television, the reader is directed to the following sources: Micheal Robin & Michel Poulin, Digital Television Fundamentals (2000); Jerry Whitaker and Blair Benson, Video and Television Engineering (2003); Jerry Whitaker, DTV Handbook (2001); Jerry Whitaker, DTV: The Revolution in Electronic Imaging (1998); and Edward M. Schwalb, Itv Handbook: Technologies and Standards (2004), with each incorporated herein by reference.

The foregoing is provided for purposes of illustrating, explaining, and describing an improved EPG system for providing multi-event PPV products. Modifications and adaptations to these embodiments will be apparent to those skilled in the art and may be made without departing from the spirit of the exemplary embodiments or the scope of the following claims.

What is claimed is:

1. A method, comprising:
  storing, in a memory device, electronic associations between multiple programming events and a package of programming;
  generating, by a processor coupled to the memory device, an electronic programming guide as a programming grid of cells, the electronic programming guide causing display of a wrapper that simultaneously highlights only the cells in the programming grid of cells that are associated with the multiple programming events associated with the package of programming, the wrapper displaying a title that is common to the multiple programming events in the package of programming;

generating, by the processor, a package mode of operation associated with the electronic programming guide, the package mode of operation responding to navigational inputs to a navigator that scroll from the title displayed by the wrapper to a different title displayed by a different wrapper associated with a different package of programming; and linking, by the processor, an entry in a cell of the cells associated with the package of programming to a prerecorded event stored in the memory device.

2. The method of claim 1, further comprising associating the cell to electronic content stored in the memory device.

3. The method of claim 1, further comprising associating the cell to electronic content stored in a digital video recorder.

4. The method of claim 1, further comprising associating the cell to electronic content stored in a set top box.

5. The method of claim 1, further comprising associating the cell to electronic content stored in a video player.

6. The method of claim 1, further comprising associating the cell to electronic content stored in a music player.

7. The method of claim 1, further comprising displaying a list of music files.

8. The method of claim 1, further comprising displaying a list of games.

9. A system, comprising:

a processor; and a memory device, the memory device storing code, the code when executed causing the processor to perform operations, the operations comprising:

retrieving an electronic association between programming events and a pay-per-view package of programming;

generating an electronic programming guide having a programming grid of cells associated with the pay-per-view package of programming, each one of the cells in the programming grid of cells associated with a different one of the programming events, the electronic programming guide displaying the programming events and a wrapper that simultaneously surrounds both contiguous and non-contiguous ones of the cells that are associated with the pay-per-view package of programming, the wrapper listing a title associated with the pay-per-view package of programming;

generating a first mode of operation associated with the electronic programming guide, the first mode of operation responding to navigational inputs to a navigator that scroll from the title displayed by the wrapper to a different title displayed by a wrapper associated with a different package of programming;

generating, by the processor, a second mode of operation associated with the electronic programming guide, the second mode of operation responding to other navigational inputs to the navigator to scroll within the wrapper between the cells that are associated with the multiple programming events; and linking an entry in a cell of the cells in the programming grid of cells associated with the programming events to a prerecorded event stored in the memory device.

10. The system of claim 9, wherein the operations further comprise processing an input that scrolls within the programming grid of cells.

11. The system of claim 9, wherein the operations further comprise processing an input that scrolls from an event of the programming events to another event of the programming events within the pay-per-view package of programming.

12. The system of claim 9, wherein the operations further comprise scrolling in the programming grid of cells from the wrapper to another wrapper associated with a different pay-per-view package of programming.

13. The system of claim 9, wherein the operations further comprise highlighting the wrapper.

14. The system of claim 9, wherein the operations further comprise scrolling in the programming grid of cells between the non-contiguous ones of the cells in the programming grid of cells.

15. The system of claim 9, wherein the operations further comprise highlighting the cell in the programming grid of cells.

16. The system of claim 9, wherein the operations further comprise highlighting each cell of the programming grid of cells that is associated with the pay-per-view package of programming.

17. The system of claim 9, wherein the operations further comprise simultaneously highlighting the wrapper and the programming events.

18. A memory device storing instructions that when executed cause a processor to perform operations, the operations comprising:

storing electronic associations between programming events and a pay-per-view package of programming;

generating an electronic programming guide having a programming grid of cells associated with the pay-per-view package of programming, each one of the cells in the programming grid of cells associated with a different one of the programming events, the electronic programming guide displaying a wrapper that simultaneously provides package information associated with the pay-per-view package of programming and event information describing the programming events;

generating a package mode of operation associated with the electronic programming guide, the package mode of operation responding to navigational inputs to a navigator to scroll between different pay-per-view packages of programming having different wrappers;

generating an event mode of operation associated with the electronic programming guide, the event mode of operation responding to the navigational inputs to the navigator to scroll between the cells associated with the programming events within the pay-per-view package of programming; and linking any one of the cells in the programming grid of cells to a prerecorded event stored in the memory device.

19. The memory device of claim 18, wherein the operations further comprise highlighting the wrapper.

* * * * *